US010310121B2

(12) United States Patent
Rouquette

(10) Patent No.: US 10,310,121 B2
(45) Date of Patent: Jun. 4, 2019

(54) SEISMIC SENSOR DEVICES, SYSTEMS, AND METHODS INCLUDING NOISE FILTERING

(71) Applicant: ION Geophysical Corporation, Houston, TX (US)

(72) Inventor: Robert E. Rouquette, Covington, LA (US)

(73) Assignee: ION Geophysical Corporation, Houston, TX (US)

( * ) Notice: Subject to any disclaimer, the term of this patent is extended or adjusted under 35 U.S.C. 154(b) by 0 days.

(21) Appl. No.: 15/806,306

(22) Filed: Nov. 7, 2017

(65) Prior Publication Data

US 2018/0059278 A1    Mar. 1, 2018

Related U.S. Application Data

(62) Division of application No. 14/774,878, filed as application No. PCT/US2014/028162 on Mar. 14, 2014, now Pat. No. 9,841,519.

(60) Provisional application No. 61/785,354, filed on Mar. 14, 2013.

(51) Int. Cl.
*G01V 1/36* (2006.01)
*G01V 1/38* (2006.01)
*G01V 1/20* (2006.01)

(52) U.S. Cl.
CPC ............. *G01V 1/364* (2013.01); *G01V 1/20* (2013.01); *G01V 1/201* (2013.01); *G01V 1/3808* (2013.01); *G01V 1/3817* (2013.01); *G01V 2210/1423* (2013.01); *G01V 2210/324* (2013.01)

(58) Field of Classification Search
CPC .... G01V 1/201; G01V 1/3808; G01V 1/3817; G01V 1/364; G01V 1/20; G01V 2210/324; G01V 2210/1423

USPC .......................................................... 367/21
See application file for complete search history.

(56) References Cited

U.S. PATENT DOCUMENTS

| 3,283,293 A | 11/1966 | Pavey, Jr. et al. |
| 3,290,645 A | 12/1966 | Pearson et al. |
| 3,299,397 A | 1/1967 | Pearson et al. |
| 3,911,388 A | 10/1975 | Crump |
| 4,135,141 A | 1/1979 | Caldwell et al. |
| 4,345,473 A | 8/1982 | Berni |
| 4,437,175 A | 3/1984 | Berni et al. |

(Continued)

FOREIGN PATENT DOCUMENTS

| EP | 0511553 A1 | 11/1992 |
| EP | 0560558 A2 | 9/1993 |

(Continued)

OTHER PUBLICATIONS

First Office Action dated Oct. 31, 2017 in connection with Mexican Patent Application No. MX/a/2015/012703, 4 pages including English translation.

(Continued)

*Primary Examiner* — Daniel L Murphy
(74) *Attorney, Agent, or Firm* — Dorsey & Whitney LLP

(57) ABSTRACT

Methods are disclosed for sensing acoustic waves in a medium. One example includes a first elongated member, a first motion sensor sensitive to vibrations of the first elongated member, a second motion sensor spaced apart from the first motion sensor and also sensitive to vibrations of the first elongated member, and a first vibration source operably coupled to the first elongated member and configured to vibrate the first elongated member.

20 Claims, 18 Drawing Sheets

(56) References Cited

U.S. PATENT DOCUMENTS

| | | |
|---|---|---|
| 4,477,887 A | 10/1984 | Berni et al. |
| 4,486,865 A | 12/1984 | Ruehle et al. |
| 4,520,467 A | 5/1985 | Berni |
| 4,821,241 A | 4/1989 | Berglund |
| 4,935,903 A | 6/1990 | Sanders et al. |
| 4,979,150 A | 12/1990 | Barr |
| 5,046,057 A | 9/1991 | Berni |
| 5,251,181 A | 10/1993 | Toda et al. |
| 5,251,183 A | 10/1993 | McConnell et al. |
| 5,265,066 A | 11/1993 | Svenning et al. |
| 5,621,699 A | 4/1997 | Rigsby et al. |
| 5,621,700 A | 4/1997 | Moldoveanu |
| 5,673,330 A | 9/1997 | Chang |
| 5,808,965 A | 9/1998 | Hull |
| 6,172,940 B1 | 1/2001 | McConnell et al. |
| 6,205,403 B1 | 3/2001 | Gaiser et al. |
| 6,386,037 B1 | 5/2002 | Kepler et al. |
| 6,512,980 B1 | 1/2003 | Barr et al. |
| 6,539,308 B2 | 3/2003 | Monk et al. |
| 6,775,618 B1 | 8/2004 | Robertsson et al. |
| 7,167,413 B1 | 1/2007 | Rouquette et al. |
| 7,239,577 B2 | 7/2007 | Tenghamn et al. |
| 7,298,672 B1 | 11/2007 | Tenghamn et al. |
| 7,359,283 B2 | 4/2008 | Vaage et al. |
| 7,379,386 B2 | 5/2008 | Muyzert et al. |
| 7,460,434 B2 | 12/2008 | Mickey, III et al. |
| 7,466,625 B2 | 12/2008 | Robertsson et al. |
| 7,468,932 B2 | 12/2008 | Tenghamn et al. |
| 7,548,486 B2 | 6/2009 | Tenghamn et al. |
| 7,623,414 B2 | 11/2009 | Teigen et al. |
| 7,926,614 B2 | 4/2011 | Tenghamn et al. |
| 8,243,547 B2 | 8/2012 | Stewart et al. |
| 8,730,766 B2 | 5/2014 | Lambert |
| 9,664,807 B2 | 5/2017 | Olivier et al. |
| 2004/0042341 A1 | 3/2004 | Tenghamn et al. |
| 2005/0194201 A1 | 9/2005 | Tenghamn et al. |
| 2006/0133202 A1 | 6/2006 | Tenghamn |
| 2006/0193203 A1 | 8/2006 | Tenghamn et al. |
| 2006/0215490 A1 | 9/2006 | Tenghamn et al. |
| 2006/0239117 A1 | 10/2006 | Singh et al. |
| 2007/0064528 A1 | 3/2007 | Metzbower et al. |
| 2007/0297287 A1 | 12/2007 | Robertsson et al. |
| 2008/0072671 A1 | 3/2008 | Eller et al. |
| 2008/0219095 A1 | 9/2008 | Perciot et al. |
| 2008/0253226 A1 | 10/2008 | Tenghamn et al. |
| 2009/0040872 A1 | 2/2009 | Pabon et al. |
| 2009/0065289 A1 | 3/2009 | Tenghamn et al. |
| 2009/0122641 A1 | 5/2009 | Hillesund et al. |
| 2009/0161487 A1 | 6/2009 | Kjellgren et al. |
| 2009/0296521 A1 | 12/2009 | Perciot et al. |
| 2009/0296529 A1 | 12/2009 | Boergen et al. |
| 2010/0039889 A1 | 2/2010 | Teigen et al. |
| 2010/0039890 A1 | 2/2010 | Tustin et al. |
| 2010/0124149 A1 | 5/2010 | Barr et al. |
| 2010/0161254 A1 | 6/2010 | Atlas et al. |
| 2010/0165792 A1 | 7/2010 | Stenzel et al. |
| 2010/0202249 A1 | 8/2010 | Goujon et al. |
| 2010/0202251 A1 | 8/2010 | Ozdemir et al. |
| 2010/0237870 A1 | 9/2010 | Dodds |
| 2011/0044129 A1 | 2/2011 | Traetten et al. |
| 2011/0176385 A1 | 7/2011 | Lambert et al. |
| 2011/0182140 A1 | 7/2011 | Lambert et al. |
| 2011/0273957 A1 | 11/2011 | Guizelin et al. |
| 2012/0057430 A1 | 3/2012 | Rouquette et al. |

FOREIGN PATENT DOCUMENTS

| | | |
|---|---|---|
| EP | 2073043 A2 | 6/2009 |
| EP | 2202540 A2 | 6/2010 |
| GB | 2411722 A | 9/2005 |
| RU | 2136019 C1 | 8/1999 |
| WO | WO2007149702 A2 | 12/2007 |
| WO | WO2011091252 A2 | 7/2011 |

OTHER PUBLICATIONS

Second Examination Report for Danish Application No. PA201570640 dated Sep. 27, 2017 (5 pages).

International Search Report and Written Opinion dated Feb. 27, 2015 in PCT Application No. PCT/US2014/028162, 12 pages.

International Search Report and Written Opinion dated Jul. 6, 2012 in connection with International Patent Application No. PCT/US2011/022059, 17 pages.

First Examination Report dated Mar. 10, 2017 in connection with Danish Patent Application No. PA 2015 70640, 10 pages.

First Technical Examination Report dated Feb. 15, 2017 in connection with Danish Patent Application No. PA 2016 70237, 9 pages.

Elboth, Thomas, "Noise in Marine Seismic Data", Series of Dissertations submitted to the Faculty of Mathematics, and Natural Sciences, University of Oslo, Norway, Ch. 9 removed, 141 pages.

International Search Report and Written Opinion dated Feb. 5, 2015 in connection with International Patent Application No. PCT/US2014/057784, 10 pages.

Third Examination Report dated Apr. 19, 2018 in connection with Danish Patent Application No. PA 2015 70640, 4 pages.

Examination report dated Aug. 16, 2018 in connection with European patent application No. 14729104.1, 7 pages.

Examination Report dated Nov. 5, 2018 in connection with Danish patent application No. PA201570640, 3 pages.

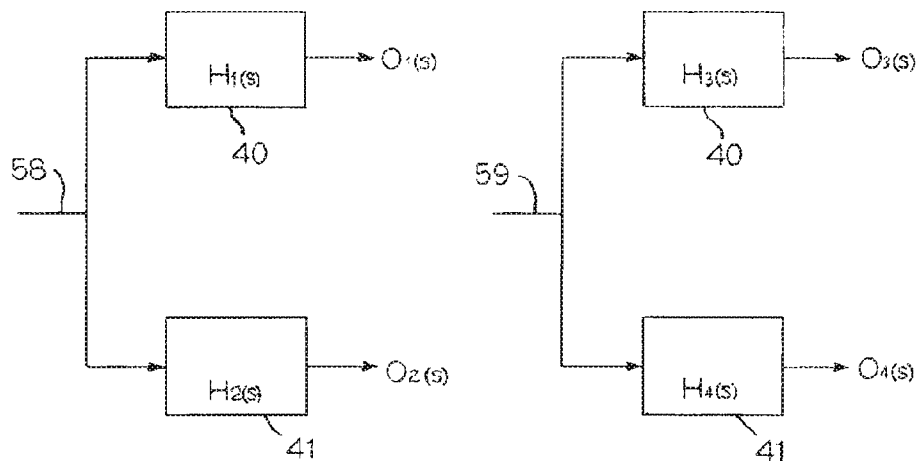
*Fig. 8*     *Fig. 9*
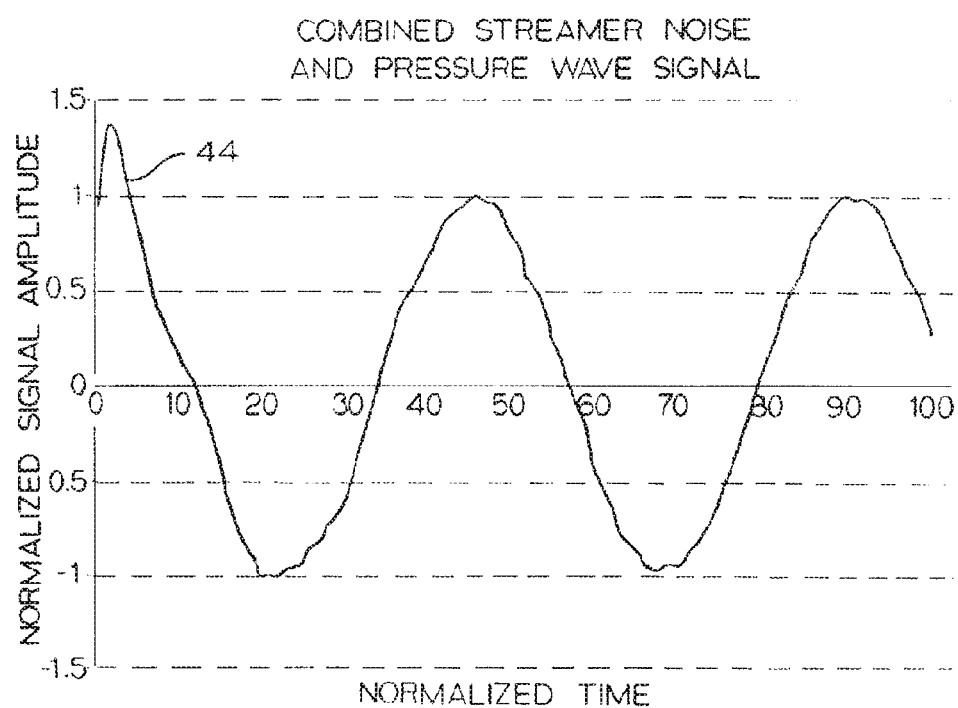
*Fig. 10*

SEISMIC SENSOR DEVICES, SYSTEMS, AND METHODS INCLUDING NOISE FILTERING

CROSS-REFERENCE TO RELATED APPLICATIONS

This application is a divisional of U.S. patent application Ser. No. 14/774,878, filed on Sep. 11, 2015, and issued Dec. 12, 2017 as U.S. Pat. No. 9,841,519, which is a national stage application of PCT Application No. PCT/US2014/028162, filed on Mar. 14, 2014, entitled "Seismic Sensor Devices, Systems, and Methods Including Noise Filtering," and claims the benefit of and priority to U.S. Provisional Application No. 61/785,354, filed on Mar. 14, 2013, entitled "Seismic Sensor System With Streamer Noise Rejection," the entire contents of each of which are hereby incorporated by reference herein for all purposes.

BACKGROUND

In towed marine seismic exploration, a hydrophone array is towed behind a marine vessel 20 near the sea surface 22, as in FIG. 1. The hydrophones are mounted in multiple sensor cables commonly referred to as streamers 24. The streamers serve as platforms for the hydrophones. A seismic sound source 26, also towed near the sea surface, periodically emits acoustic energy. This acoustic energy travels downward through the sea, reflects off underlying structures or subsea strata 28, and returns upward through the sea to the hydrophone array. Reflected seismic energy arrives at towed-array receive points. The hydrophone array contains many such receive points and records the upward traveling seismic acoustic wavelet from the seabed 30 at each of the receive points. The hydrophone recordings are later processed into seismic images of the underlying structures.

Noise is a major consideration in towed streamer operations. Noise sources include swell noise and wave noise from the sea surface. And towing the streamer through the water causes noise. Some of this noise propagates through the streamer and some through the water column itself. The typical way of dealing with noise sources is to use a combination of temporal and spatial filtering. Temporal filtering is accomplished by discrete digital sampling of the hydrophone signals in time with weighting applied to the samples. The hydrophone channels also include analog filters to prevent aliasing of signals at frequencies greater than half the sample rate. The spatial samples are typically formed by group-summing individual hydrophone outputs so that pressure noise propagating along the length of the streamer is attenuated. This spatial sampling has no impact on noise that propagates in a direction orthogonal to the streamer axis. Typical hydrophone groups consist of eight or so hydrophones in a 12 m section of the streamer.

Acoustic impedance, $\rho c$, is the product of the density and the speed of sound in a medium. Reflection of at least some of the sound-wave energy occurs whenever a change in acoustic impedance is encountered by the sound waves. The energy that is not reflected is transmitted (refracted) beyond the boundary between the two regions of different acoustic impedances. The pressure waves are compression waves, which induce particle motion in the direction of propagation. At a planar interface between two different homogenous media, a sound wave reflects at an angle equal to the angle of incidence $\theta_1$ and refracts at an angle $\theta_2$. The refraction angle is given by:

$$\theta_2 = \sin^{-1}(c_2 \sin \theta_1 / c_1).$$

The subscript refers to the sound wave moving from medium 1 to medium 2 and $c_1$ and $c_2$ are the speeds of sound in each medium. If the incident angle this zero, then the refracted energy propagation path will be at an angle $\theta_2$ of zero.

For an incident angle $\theta_1$ of zero and no energy converted to shear energy, the reflection coefficient at the water-air interface is described by:

$$R_{pp} = (\rho_2 \cdot c_2 - \rho_1 \cdot c_1)/(\rho_2 \cdot c_2 + \rho_1 \cdot c_1) \approx -1.$$

The reflected energy at the water-air interface is $R^2_{pp}$, or nearly 1, making the sea surface a near perfect reflector of sound energy. After returning from the sea bottom or the target of interest, the energy is again reflected by the sea surface back to the streamer. Because a typical hydrophone has an omni-directional response, the hydrophone array also records a ghost response, which is the seismic acoustic wavelet reflected from the sea surface and arriving delayed in time and reversed in polarity. The ghost is a downward-traveling seismic acoustic wave that, when added to the desired wave, detracts from the recorded seismic image. The ghost-causing reflection can also continue to the sea bottom or other strong reflector and be reflected back up to again interfere with the desired reflections and further degrade the image. These reflections are commonly referred to as multiples.

For a vertically traveling pressure wave, the ghost produces a notch in the frequency spectrum of a hydrophone response at $f_{notch} = c/2d$, where c is the speed of sound and d is the streamer depth. Seismic streamers have been conventionally towed at a depth of 10 m or less. At a depth of 10 m, the notch frequency ($f_{notch}$) is 75 Hz. A frequency response extending beyond 100 Hz is required for high seismic image resolution. Because the notch frequency is inversely proportional to the tow depth, streamers are often towed at shallower depths to improve the resolution of a seismic image. Towing at shallow depths is problematic because noise from the sea surface begins to interfere with the desired seismic signals. These effects are worsened as weather deteriorates, sometimes causing the crew to discontinue operations until the weather improves. The elimination of ghost-notch effects would enable towing at greater depths farther away from surface disturbances.

Ocean bottom systems, in which the seismic sensors are placed on the seabed, reject ghosts and multiples by a technique commonly known as p-z summation. In an acoustic wave, the pressure p is a scalar, and the particle velocity u is a vector. A hydrophone, with a positive omni-directional response, records the seismic acoustic wave pressure p. A vertically oriented geophone or accelerometer records the vertical component of the seismic acoustic-wave particle velocity $u_z$, with a positive response to up-going signals and a negative response to down-going signals. In p-z summation, the velocity signal is scaled by the acoustic impedance $\rho c$ of seawater before it is added to the pressure signal. A gimbaled single-axis sensor is also scaled to account for the change in sensitivity of the particle-motion sensor due to the off-axis arrival of any received signals. If an accelerometer is used, its output signal can be integrated to obtain the velocity signal, or the hydrophone signal can be differentiated so that it can better spectrally match the accelerometer. This produces a compound sensor that has a full response to the upward traveling wave and at least a partially muted response to the downward traveling wave to reject the ghost and multiples. One such method of signal conditioning and combination of signals to get a single de-ghosted trace is described in U.S. Pat. No. 6,539,308 to Monk et al. FIG. 2 is a two-dimensional (2D) representation of the response of a particle-velocity sensor. FIG. 3 is a 2D representation of the response of an omni-directional hydrophone summed with the response of a vertical particle-motion sensor. The full three-dimensional responses can be envisioned by rotating the 2D responses about their vertical axes.

Operating a particle-motion sensor in a seismic streamer presents a problem because the streamer experiences accelerations due to towing or sea surface effects that are large compared to accelerations caused by the desired seismic reflections. Moreover, these unwanted accelerations are in the same spectral band as the desired reflection response. When a towing vessel encounters ocean waves, there are small perturbations in the speed of the vessel. The vessel also typically undergoes a yawing motion. FIG. 4 depicts energy being imparted to the streamers 24 by speed variations 32 and yawing motion 34. FIG. 5 is a side view depicting energy causing accelerations and transverse waves in the streamer 24. (The energy's effect on the streamer is exaggerated in FIG. 5 for illustrative purposes.) Most of the energy is attenuated by elastic stretch members 36, typically in front of the sensing arrays. While the energy is greatly attenuated, some does remain. Accelerations a caused by planar pressure waves due to the desired seismic reflections are given by:

$$a = p \cdot 2 \cdot \pi \cdot f / Z$$

where p is the acoustic sound pressure level, f is the frequency, and Z is the acoustic impedance.

Performance of a particle-velocity measuring system may be near the ambient noise limits. Typically, seismic-data customers require ambient noise from streamer hydrophone systems to be below 3 μbar. Since the acoustic impedance of seawater is 1.5 MPa·s/m, a 3 μbar pressure wave at 4 Hz produces particle accelerations of roughly 0.5 μg. FIG. 6 shows a mechanical model of the frequency response of typical cable axial accelerations in the middle of a streamer. The presence of a secondary peak at 4 Hz, only 1.5 orders of magnitude below the primary peak, indicates that, in some cases, the cable dynamic motion can be greater than the seismic signal to be measured.

U.S. Pat. No. 7,167,413 to Rouquette uses an accelerometer in a seismic streamer to reject the ghost-notch effect. Rouquette uses a mass-spring system to reduce the effect of cable dynamics on the accelerometer and a load-cell system to measure and reject the cable-motion-induced noise on the accelerometer. The Rouquette system relies on well-known complex mechanical relationships that do not remain constant with manufacturing tolerances, aging, and environmental conditions. Rouquette uses a signal-processing adaptive algorithm to derive the relationship of the load-cell-sensor-and-mass-spring system to the acceleration acting on the accelerometer in situ. Rouquette describes a complex mechanical and electronic system.

U.S. Pat. No. 7,239,577 to Tenghamn et al. describes an apparatus and method for rejecting the ghost notch using an acoustic-wave particle-velocity sensor. Tenghamn et al. relates to the use of a fluid-damped, gimbaled geophone. The fluid encapsulating the geophone is chosen to provide damping of the sensor swinging on its gimbals. While not described in Tenghamn et al., it is known in the art that a mass-spring vibration-isolation system can reduce the effect of cable mechanical motion on the geophone response. Motion of the geophone caused by cable mechanical motion may be indistinguishable from acoustic-wave particle motion in the geophone response. The seismic-wave particle motion of interest may be obscured by cable mechanical motion in Tenghamn et al. This technique also gives the response similar to the cardioid in FIG. 3, where there are still undesired signals coming from the surface and being induced by streamer excitation along the streamer axis.

U.S. Pat. No. 7,359,283 to Vaage et al. involves a method of combining pressure sensors and particle-motion sensors to address the impact of mechanical motion on the particle-motion sensors. In this method, the response of the particle-motion sensor below a certain frequency $f_0$ is not used but only estimated from the pressure-sensor response and known pressure-sensor depth. The frequencies rejected are those for which mechanical motion of the streamer is expected. The estimated response has poor signal-to-noise ratio at the lower frequencies of interest. This rejection below a certain frequency is not optimal as it also rejects valid signals in an important low-frequency band where deep-target data is likely to exist.

While these patents all describe methods to reject the ghost notch in a seismic streamer, none adequately addresses the effects of streamer tow and other noise that affects the particle-motion sensor or hydrophone measurements. All also fall short of producing high-fidelity, sensed acoustic-wave components with good signal-to-noise ratio down to the lowest frequencies of interest.

SUMMARY

Implementations of the present invention provide systems, methods, and apparatus for sensing seismic signals in a marine environment. One example system for sensing acoustic waves in a medium includes a first elongated member, a first motion sensor sensitive to vibrations of the first elongated member, a second motion sensor spaced apart from the first motion sensor and also sensitive to vibrations of the first elongated member, and a first vibration source operably coupled to the first elongated member and configured to vibrate the first elongated member.

In some embodiments, the system further includes a processing device operably coupled to the first motion sensor and the second motion sensor, the processing device configured to calculate a transfer function at least partially based on information received from the first motion sensor and the second motion sensor while the vibration source vibrates the first elongated member, the processing device being further configured to calculate a filtered acoustic wave signal based at least in part on the calculated transfer function. The system may also include a third motion sensor, where the processing device is further configured to calculate the transfer function at least partially based on information received from the third motion sensor while the first vibration source vibrates the first elongated member. The third motion sensor may also be sensitive to vibrations of the first elongated member. The first motion sensor and the third motion sensor may be longitudinally spaced apart along the first elongated member, and the second motion sensor may be positioned between the first motion sensor and the third motion sensor. The system may further include a second vibration source operably coupled to the first elongated member and configured to vibrate the first elongated member.

In some embodiments, the first elongated member may be a stress member. The first vibration source may be coupled to the first elongated member in a manner that vibration of the vibration source produces corresponding vibration of the first elongated member. The first vibration source may include a motor with an eccentrically loaded shaft, and a rotation axis of the motor may be oriented approximately longitudinally relative to the first elongated member. The vibration source may be configured to vibrate the first elongated member in a transverse direction relative to the first elongated member.

An example method of sensing acoustic waves in a medium may include the acts of receiving readings from a first motion sensor and from a second motion sensor, the first motion sensor and the second motion sensor both coupled to a streamer, receiving readings from a third motion sensor also coupled to the streamer, the third motion sensor positioned between the first motion sensor and the second motion sensor, and filtering noise from the readings received from the third motion sensor to generate a set of filtered data. The filtering noise may include the acts of determining first and second transfer functions corresponding to the streamer, modifying the readings received from the first motion sensors using the first transfer function to generate a first set of modified readings, modifying the readings received from the second motion sensor using the second transfer function to generated a second set of modified readings, and modifying the readings received from the third motion sensor using the first and second sets of modified readings to generate the set of filtered data.

In some embodiments, the first and second transfer functions may be determined prior to receiving the readings from the first, second, and third motion sensors. The determining of the first and second transfer functions may include the acts of introducing first vibrations into the streamer using a first vibration source, sensing the first vibrations using at least the first and third motion sensors, introducing second vibrations into the streamer using a second vibration source, sensing the second vibrations using at least the second and third motion sensors, and calculating the first and second transfer functions based on the sensing of the first and second vibrations.

In some embodiments, modifying the readings received from the first motion sensor using the first transfer function may include multiplying the readings received from the first motion sensor by the first transfer function, and modifying the readings received from the second motion sensor using the second transfer function may include multiplying the readings received from the second motion sensor by the second transfer function. Further, modifying the readings received from the third motion sensor may include subtracting the first and second sets of modified readings from the readings from the third motion sensor. In some embodiments, the method may further include the act of advancing the streamer in the medium. The method may include the acts of advancing the streamer in a first direction, and determining the first and second transfer functions corresponding to the streamer advancing in the first direction, and also advancing the streamer in a second direction, and determining third and fourth transfer functions corresponding to the streamer advancing in the second direction.

An example method of characterizing a marine seismic streamer may include the acts of delivering first vibrations to a first portion of the streamer, the first vibrations propagating from a first location toward a first motion sensor and further toward a second motion sensor, receiving first readings from the first motion sensor and from the second motion sensor corresponding to the first vibrations, delivering second vibrations to a second portion of the streamer, the second vibrations propagating from a second location toward a third motion sensor and further toward the second motion sensor, receiving second readings from the second motion sensor and from the third motion sensor corresponding to the second vibrations, and calculating one or more transfer functions representative of the marine seismic streamer based on the received first and second readings.

In some embodiments, the method may further include the act of operating one or more artificial vibration sources to produce the first vibrations or second vibrations. The one or more transfer functions may be representative of physical characteristics of the streamer that determine how noise is transmitted along the streamer.

An example method of sensing acoustic waves in a medium may include the acts of transmitting first vibrations using a first vibration source positioned at a first location along a streamer, sensing the first vibrations using a first motion sensor and a second motion sensor, transmitting second vibrations using a second vibration source positioned at a second location along the streamer, sensing the second vibrations using a third motion sensor and the second motion senor, characterizing the streamer based at least in part on the sensing of the first and second vibrations, and filtering acoustic wave measurements from the second motion sensor based at least in part on the characterization of the streamer. In some embodiments, the first and second vibrations may each include a sweep of a plurality of vibration frequencies.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. For better understanding, the like elements have been designated by like reference numbers throughout the various accompanying figures. Understanding that these drawings depict only typical embodiments of the invention and are not therefore to be considered to be limiting of its scope, the invention will be described and explained with additional specificity and detail through the use of the accompanying drawings in which:

FIG. 8 is a frequency-domain schematic diagram of the responses of the motion sensors as in FIG. 7 to the acoustic wave component of incident acoustic energy according to an embodiment;

FIG. 9 is a frequency-domain schematic diagram of the responses of motion sensors of FIG. 7 according to an embodiment;

FIG. 10 is a time-domain plot of the output of a motion sensor of FIG. 7 that is responsive to platform motion and acoustic pressure waves according to an embodiment;

DETAILED DESCRIPTION

Figure 1:
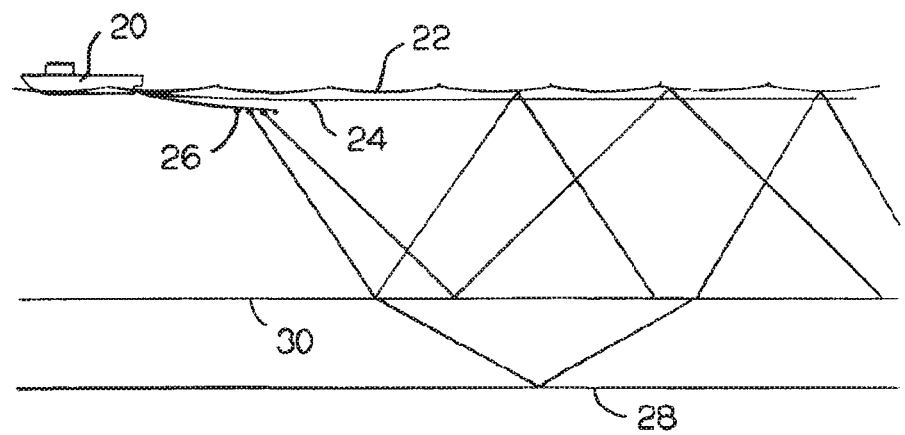
FIG. 1 is a side elevation view of a typical seismic survey operation showing an array of hydrophones under tow behind a survey vessel and depicting rejected seismic energy arriving at towed-array receive points.
Figure 2:
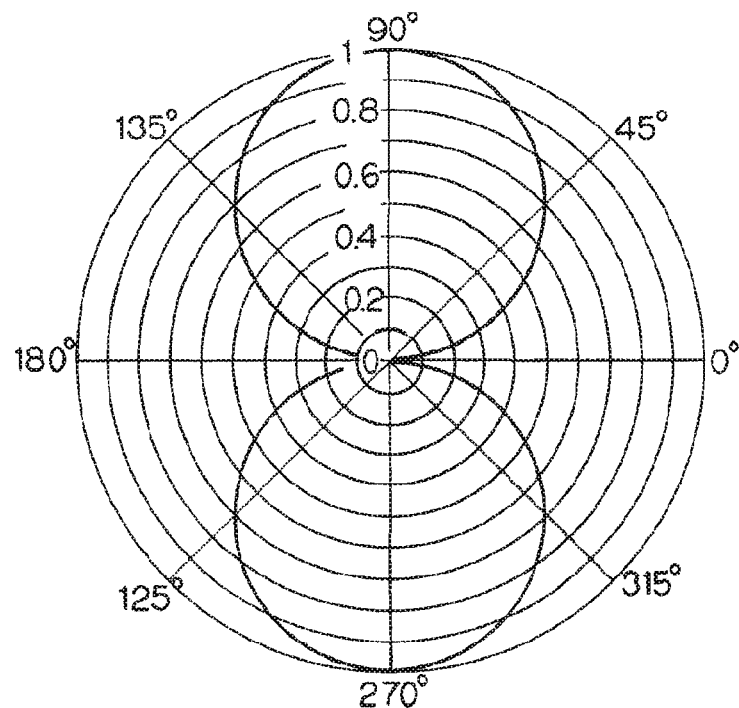
FIG. 2 is a two-dimensional graph of the response of a particle-velocity sensor.
Figure 3:
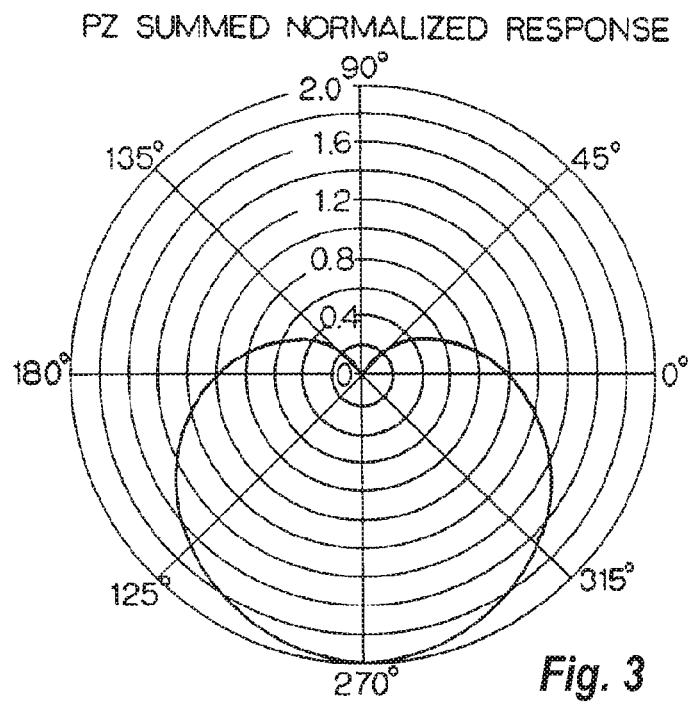
FIG. 3 is a two-dimensional graph of the response of an omni-directional hydrophone summed With the response of a vertical particle-velocity sensor.
Figure 4:
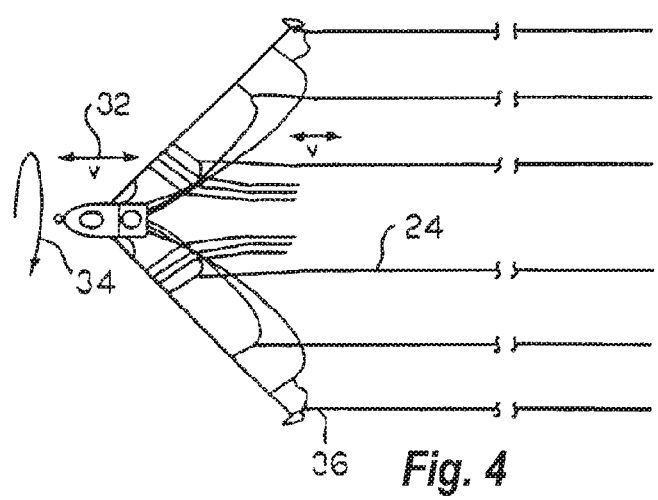
FIG. 4 is a top plan view of a typical survey as in FIG. 1 depicting tow-speed fluctuations and yaw.
Figure 5:
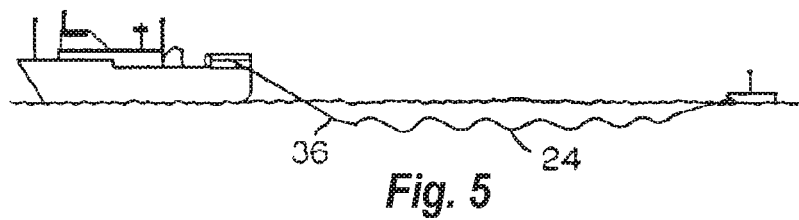
FIG. 5 is a side elevation view of a survey as in FIG. 4 depicting the exaggerated effects of tow-speed fluctuations and yaw on streamer shape.
Figure 6:
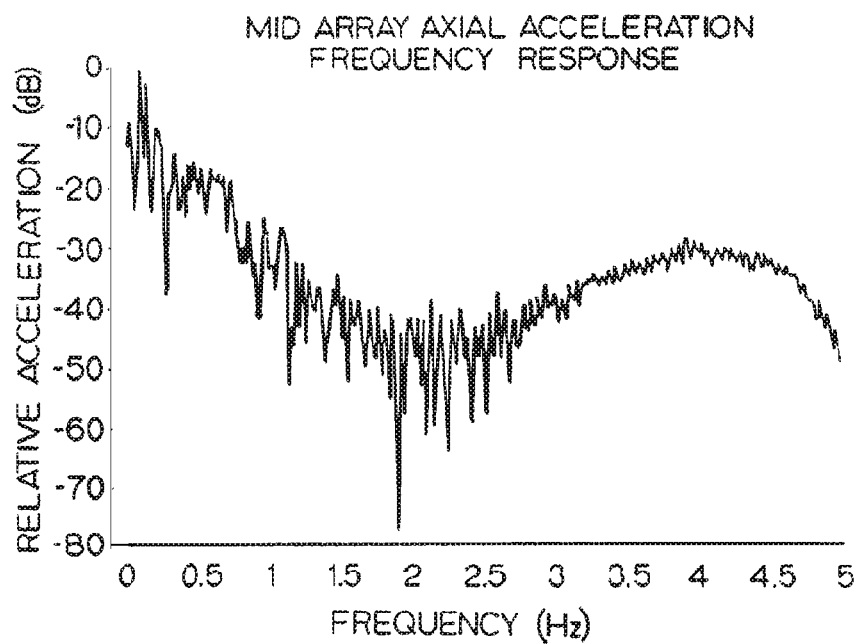
FIG. 6 is a plot of typical accelerations of a streamer in a survey as in FIG. 1.
Figure 7:
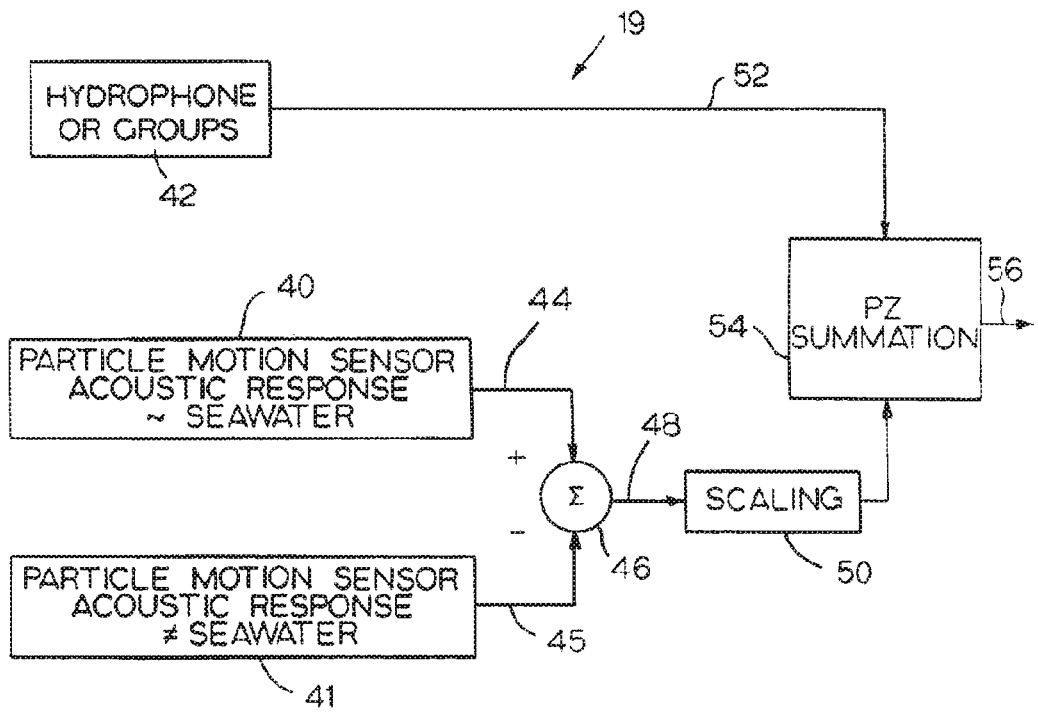
FIG. 7 is a schematic diagram of a seismic system including motion sensors according to an embodiment.

FIG. 7 is a block diagram of a general version of an underwater seismic system 19 according to an embodiment of the disclosure. The underwater seismic system 19 may involve techniques for using motion sensors or sensor assemblies with different responses to sound-wave-induced signals and similar responses to platform (e.g., streamer, cable, or autonomous node), motion to improve the signal-to-noise ratio of data acquired for seismic imaging. In FIG. 7, two motion sensors 40, 41 and one pressure sensor 42, such as a hydrophone, provide signals that may be combined to produce a noise-reduced and de-ghosted signal (i.e., at least a partially filtered signal or reading). A group of pressure sensors can be used in lieu of a single sensor, e.g., to reduce the noise arising from pressure waves, which may propagate in a longitudinal direction along the streamer. The motion sensors may be dc-sensitive and/or capable of resolving or identifying the gravity vector (i.e., direction and magnitude); otherwise, one or more additional orientation sensor may be used to determine the orientation of the streamer.

The first motion sensor 40 may have a response to acoustic waves that is ideally, but not necessarily, equal to that of the medium in which the streamer is submerged, such as seawater. Moreover, the response may be increased beyond that of seawater if more gain is desired. The second motion sensor 41 has a response to acoustic waves that is measurably different from that of the first motion sensor 40. This difference in acoustic response may be obtained by using different materials or material composition or the geometric configuration of the sensors. In one or more embodiments, the material and geometric properties of one or more sensors may be chosen to match mechanical responses to platform motion. For example, if one, some, or all of the motion sensors are designed to interact with a cable in the same way as a second-order mass-spring system, then the masses (including added mass, if appropriate) of the sensors and their associated spring constants are made equal.

In some embodiments, the readings or signals from the first and second sensors 44, 45 may combined or processed to produce an improved signal. For example, the first and second outputs 44, 45 of the first and second motion sensors 40, 41 may be subtracted at block 46, either locally or after remote processing, to produce a reduced-noise response signal 48 indicating particle motion due to acoustic waves with platform motion attenuated. If the signal of one of the sensors is reversed in phase, combining the first sensor signal and the second sensor signal may involve adding signals instead of subtracting.

Moreover, in some embodiments, the reduced-noise or filtered response may be scaled at block 50 to match the pressure-sensor response 52 (e.g., the hydrophone signal) and may be used in p-z summation at block 54 to produce a final output signal 56 that also may account for and reject ghost notches and multiples. The combining the first sensor signal and the second sensor signal and the p-z summation may be performed locally by a general or special purpose computer, including but not limited to analog circuitry, digital logic circuitry, algorithmically in a microprocessor, remotely on a shipboard computer, in off-line data processing, etc.

FIG. 8 is a block diagram of the motion sensors 40, 41 of FIG. 7 shown in the frequency domain and indicating their transfer functions to the acoustic wave component 58 of incident energy. The acoustic wave component includes the seismic signals of interest. The first sensor 40 and the second sensor 41 may have unequal or different acoustic wave transfer functions $H_1(s)$ and $H_2(s)$. The transfer function $H_1(s)$ is sensitive to acoustic wave particle motion, so that the first sensor 40 produces an output response $O_1(s)$ that represents or relates to particle motion. The transfer function $H_2(s)$ is insensitive or less sensitive to acoustic wave particle motion, and the second sensor 41 has an output response $O_2(s)$ that at least substantially does not include the motion of surrounding acoustic-medium particles.

FIG. 9 is a block diagram of the motion sensors 40, 41 of FIG. 7 in the frequency domain indicating their transfer functions to the platform-motion component 59 of incident energy. The transfer functions $H_3(s)$ and $H_4(s)$ of the two motion sensors 40, 41 to platform motion are proportional (or equal) in magnitude, but could be opposite in phase. Thus, both sensors 40, 41 have similar output responses $O_3(s)$ and $O_4(s)$ to platform motion. The composite transfer functions of the first and second motion sensors 40, 41 to incident energy are the combinations of $H_1(s)$ and $H_3(s)$ for the first sensor and of $H_2(s)$ and $H_4(s)$ for the second sensor. The composite responses of the two sensors are the combinations of $O_1(s)$ and $O_3(s)$ for the first motion sensor and of $O_2(s)$ and $O_4(s)$ for the second motion sensor.

Figure 11:
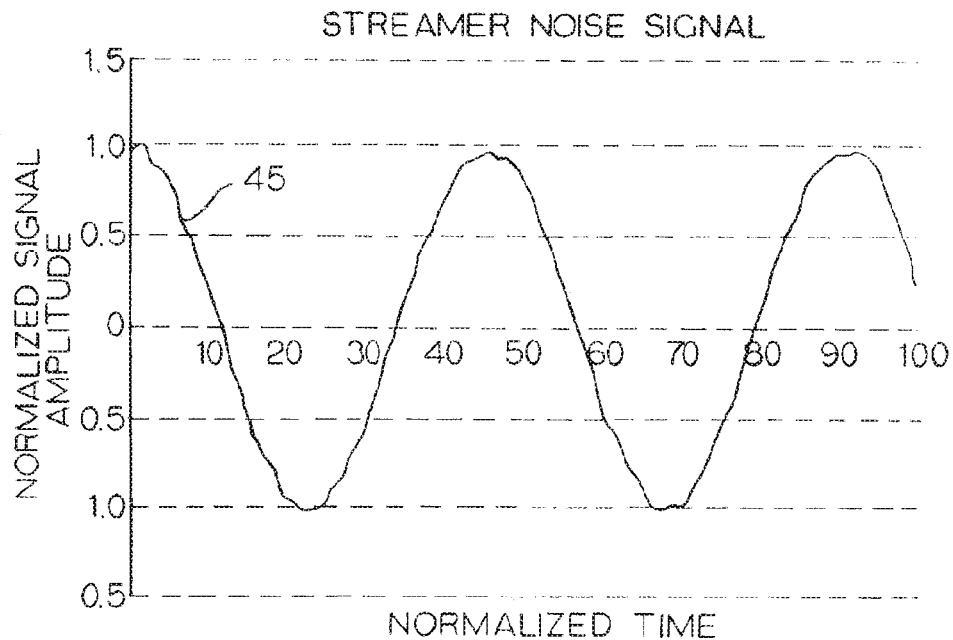
FIG. 11 is a time-domain plot of the output of a motion sensor of FIG. 7 that is responsive only to platform motion according to an embodiment.
Figure 12:
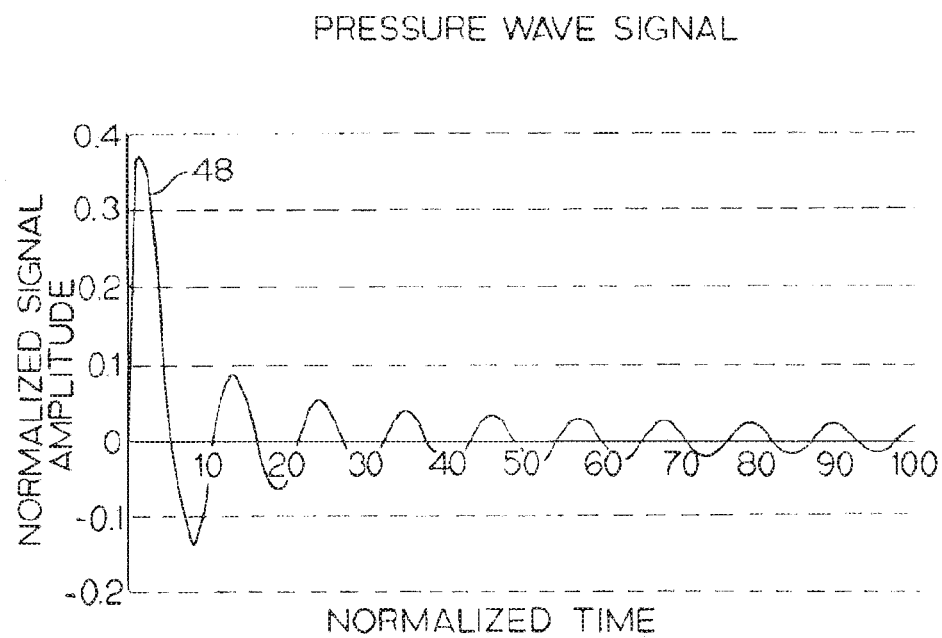
FIG. 12 is a plot of the difference between the plots of FIGS. 10 and 11.

FIG. 10 is an example representation of the time-domain response of the first sensor 40 to incident energy that includes both platform motion and acoustic waves. The first sensor's response 44 is sensitive to both platform noise and the acoustic wave. FIG. 11 is the corresponding response of the second sensor 41 to the same incident energy. The second sensor's response 45 is sensitive only to the platform-noise component of the incident energy or at least less sensitive to acoustic waves. FIG. 12 is a plot of the result of combining the responses of the two sensors by subtracting the output 45 of the second sensor from the output 44 of the first sensor to produce the noise-subtracted acoustic wave signal 48 of FIG. 7. Although, for purposes of simplifying the description, the response of the second sensor to pressure waves was treated as zero, it may have some slight response, or even a negative response, to pressure waves. Furthermore, the first and second sensor outputs may not be exactly matched to streamer vibrations. In any event, in one or more embodiments, the signal subtraction still results in an acoustic wave response with a greatly attenuated platform-motion response that can be scaled and combined with the hydrophone data by p-z summation.

Various specific versions of the general system indicated in the block diagrams of FIGS. 7-9 use different levels of acoustic impedance to achieve the desired difference in response to acoustic wavelets. As described above, the motion sensors 40, 41 and the pressure sensor 42 are mounted in, on, or to a platform (e.g., to a stress member of the streamer, as described below in further detail). For example, the motion sensors 40, 41 and/or pressure sensors 42 may be enclosed in an underwater streamer or mounted inside a cable-positioning bird attached to a streamer. The motion sensors may be isolated acoustically from each other, but may be located close together and separated into individual regions by a divider, for instance.

The first motion sensor may be enclosed in a first region with an exterior whose acoustic impedance is similar to that of the surrounding seawater so that acoustic waves penetrate the exterior with minimal reflections and act on the sensor. The second motion sensor may be located in an acoustically opaque enclosure in a second region and may be at least substantially unaffected by incident acoustic waves. The streamer may be under tension (e.g., during operation thereof) and may have a small and/or erratic or irregular response to the acoustic waves. Any response of the streamer to the acoustic waves may be recorded as platform motion. Therefore, in some instances, the first sensor may have a proportional response to acoustic waves, and the second sensor may have a negligible response to acoustic waves. Additionally, in some embodiments, the sensors may be calibrated to have matched responses to platform motions, (e.g., to streamer vibrations), for instance, by equating their masses (including added mass, if appropriate) and associated spring constants if they behave as second-order mass-spring systems. Subtraction, either locally or after remote processing, of the second sensor signal from the first sensor signal accordingly yields the desired acoustic wave signal with greatly attenuated streamer-motion response.

Figure 13:
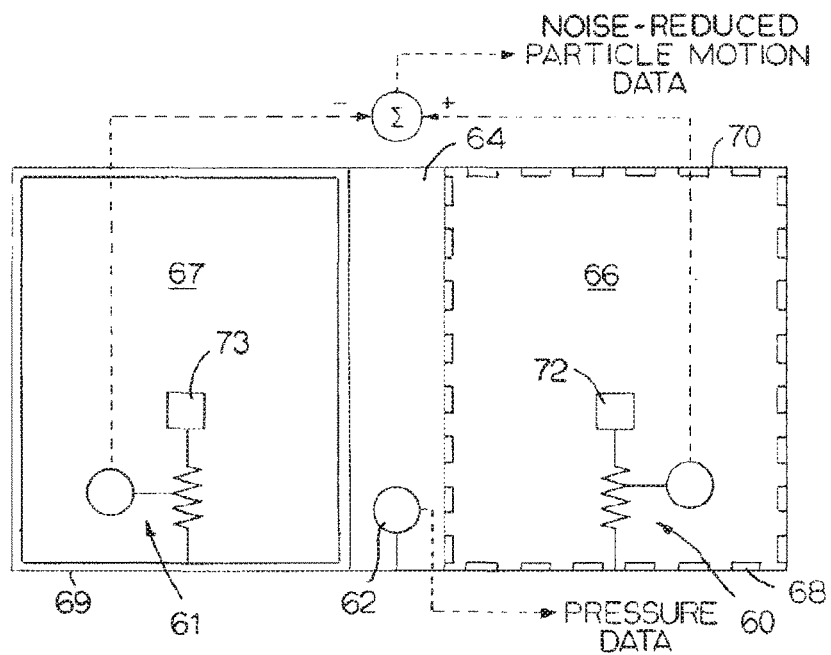
FIG. 13 is a schematic diagram of a seismic system according to an embodiment.

An example of the seismic system of FIGS. 7-9 is shown in FIG. 13 with two motion sensors 60, 61, which may be separated acoustically by a central divider 64. The seismic system may also include a pressure sensor 62. In some embodiments, the first motion sensor 60 may be contained in a first region 66 of the streamer with a rigid, acoustically transparent exterior 68. For example, the exterior 68 may be a perforated, rigid housing covered with a flexible and/or acoustically transparent skin 70. The interior of the first region 66 may be filled with fluid.

In some embodiments, the skin and fluid both may have acoustic impedances equal to that of the surrounding medium, such as seawater. A first test mass 72 may have an acoustic response similar to that of the fluid or other medium surrounding the first test mass 72 in some embodiments; in other embodiments, however, the response of the first mass 72 may be increased beyond that of the surrounding medium (e.g., if more gain is desired).

In some embodiments, the first test mass 72 is connected to the exterior of the streamer by means of a displacement, velocity, or acceleration sensor, which serves as the motion sensor. The first sensor 60 may use the exterior of the streamer as a frame of reference and may act as a spring in coupling the test mass and streamer dynamically. For example, the first sensor may be single crystal or a PZT bender. If the sensor is a single-axis sensor, multiple test-mass systems may be used to form a multi-axis sensor (e.g., two-axis or three axis sensor), which may include some or all test masses calibrated to match in both acoustic and dynamic response. Alternatively or additionally, an embodiment may include several sensors connected to a common test mass for multi-axis measurement.

In some instances, the second sensor 61 and a second test mass 73 may be connected in an assembly in a second region 67 on the opposite side of the divider from the first region 66. The second sensor may differ from the first sensor in that housing exterior 69 of the second sensor may have an acoustic impedance much greater than that of the surrounding medium. Furthermore, in some examples, the interior 67 of the second sensor housing may be filled with air to account for any non-negligible elasticity in the housing exterior 69. Augmenting the effects of the increased acoustic impedance of the second sensor's housing is its rigidity, which may allow the housing to act as an acoustic shield, analogous to a Faraday cage in electromagnetism. The acoustic impedance of the housing exterior 69 may include a material having a suitably high density or sound speed.

Figures 14A, 14B:
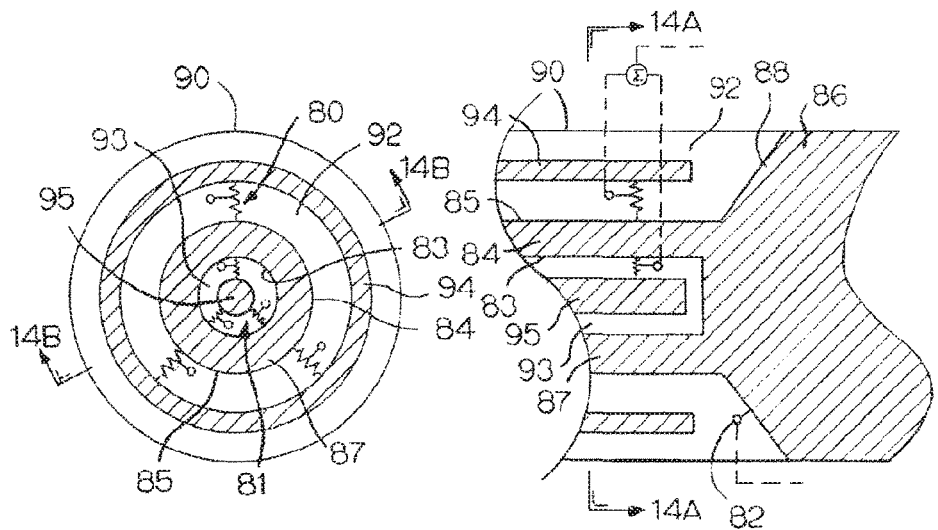
FIGS. 14A and 14B are cross-sectional views of a seismic system according to another embodiment.

As shown in FIGS. 14A and 14B, in additional or alternative embodiments, a seismic system may include two sets 80, 81 of motion sensors and a pressure sensor 82. For example, the first sensor set 80 and the second sensor set 81 may be connected to a single rigid body 84 that carries streamer vibrations. The rigid body 84 has a large-diameter first portion 86, a smaller-diameter second portion 87, and a transition section 88 joining the first and second portions 86, 87. In at least one embodiment, the smaller-diameter portion 87 is tubular in shape with an inner side 83 and an outer side 85. The first sensor set 80 may encircle or surround a section of the second portion 87 of the rigid body 84 and may be connected to outer side 85 of the rigid body 84.

Three or more individual sensors may be used to constitute the first set 80. If axisymmetry is not employed, then the first sensor set 80 may be located alongside the rigid body 84. An acoustically transparent exterior 90, which may consist of a flexible membrane over a perforated, rigid housing, separates the sensor system from the surrounding medium, such as seawater. A first cavity 92, may be located between the second portion 87 of the rigid body 84 and the exterior 90 and may be filled with fluid. In some embodiments, the exterior 90 and the fluid have acoustic impedances equal to the acoustic impedance of the surrounding medium.

A first test mass 94, with acoustic properties similar to or the same as the acoustic properties of the first test mass of FIG. 13, may be suspended in the first cavity 92 and may encircle the second portion 87 of the rigid body 84. The first test mass 94 may be mechanically coupled to the outer side 85 of the rigid body 84 by the first set 80 of motion sensors with properties that may be similar to or the same as the properties of the first sensor 60 of FIG. 13, but with the rigid body 84 as their frame of reference. In some instances, a second cavity 93 may be contained entirely within the tubular second portion 87 of the rigid body 84.

In one or more embodiments, the second cavity 93 contains a second test mass 95 suspended in fluid and coupled to the rigid body 84 by the second set 81 of motion sensors connected to the inner side 83 of the rigid body 84. The dynamic response of the second set 81 of sensors may be calibrated to have a response to streamer vibrations that matches the response of the first set 80. Unlike the first test mass 94, however, no requirements are placed on the acoustic response of the second test mass 95. The rigid body 84 may act as an acoustic shield to the second sensor set 81 and may include a material with relatively high acoustic impedance. A benefit of this coaxial arrangement is that multiple individual sensors respond to the accelerations of each test mass. Combining the output signals of the motion sensors may produce a more accurate reading or estimate of the actual acceleration values. In some instances, the first and second sensor sets 80, 81 are sensitive to radial motion; an additional test-mass-sensor system may be included in each cavity in alignment with the streamer axis if tri-axis sensitivity is needed.

Figure 15:
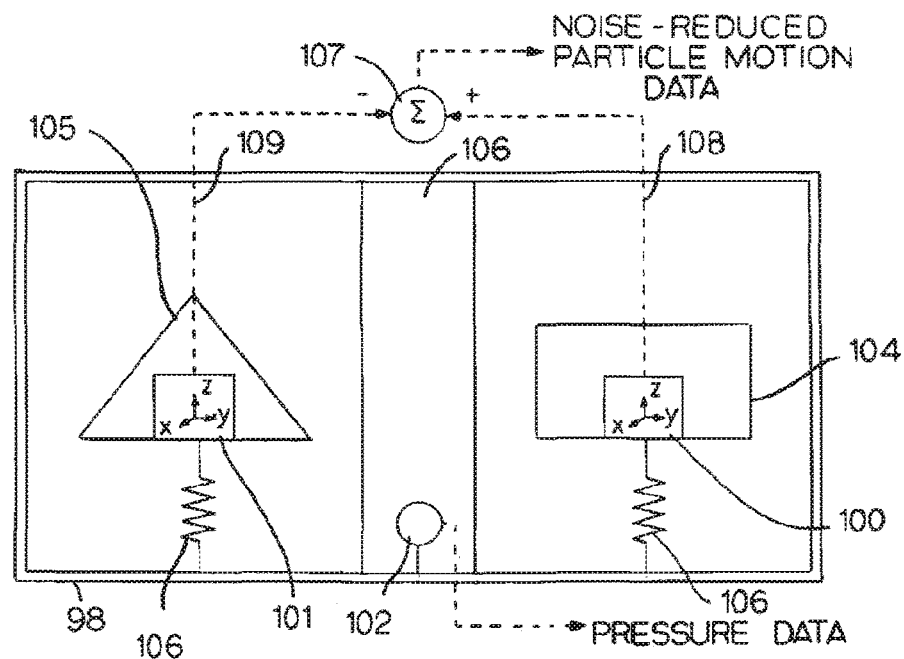
FIG. 15 is a schematic diagram of a seismic system according to yet another embodiment.

As shown in FIG. 15, embodiments may also include a streamer with a rigid, acoustically transparent exterior 98, which may have two motion sensors 100, 101, such as dc-sensitive, tri-axis accelerometers, and one pressure sensor 102, such as a hydrophone. The exterior 98 may comprise, for instance, a perforated, rigid housing covered with a flexible, acoustically transparent skin. The accelerometers may include microelectromechanical system (MEMS), PZT, single crystal, other suitable devices or systems, or any combination thereof.

The motion sensors 100, 101 are rigidly mounted to first and second rigid housings 104, 105 and may directly sense or measure dynamic streamer motion. Moreover, the motion sensors 100, 101 may be acoustically coupled to the cable exterior 98, but may be acoustically isolated from each other, for instance, by a central divider 106. Each of the first and second housings 104, 105 may be constructed and/or configured such that the mass of the first housing 104 plus the mass enclosed therein is equivalent to the mass of the second housing 105 plus the mass enclosed therein.

The dynamic couplings 106 between the housings and the streamer exterior 98 may be designed or configured to act as second-order mass-spring systems with equal spring constants so that the equality of the mass-spring relationships is preserved. Additionally or alternatively, in some examples, the first and second 104 housings 104, 105 may have different acoustic cross-sections, so as to generate different responses to acoustic pressure waves. Specifically, in some embodiments, the first sensor 100 generates a first sensor signal 108 that is a good representation of the acoustic particle motion, and the second sensor 101 produces a second sensor signal 109 that is largely insensitive to acoustic waves. The first and/or second housings 104, 105 may have different geometries, different materials, different cross-sections, or otherwise different configurations, so as to have different transfer functions for each sensor.

The second sensor signal 109 may be subtracted at block 107 from the first sensor signal 108, which may provide a suitable or desired pressure wave signal with greatly attenuated response to streamer motion. Open-cell foam can be used, for example, to serve as the dynamic couplings 106 between the first and/or second housings 104, 105 and the exterior 98. Filled with a fluid calibrated to match the acoustic impedance of the surrounding medium, such as seawater, the foam can serve also as a transparent acoustic coupling. In at least one example, the first housing 104 may be sealed with respect to the fluid and filled with air to account for any non-negligible elasticity in the housing. In some embodiments, the second housing 105 is perforated or slotted and allowed to fill with the surrounding fluid. Hence, in some instances, the resultant disparity in overall density between the housings may accommodate or account for different responses thereof to incident pressure waves.

Figure 16:
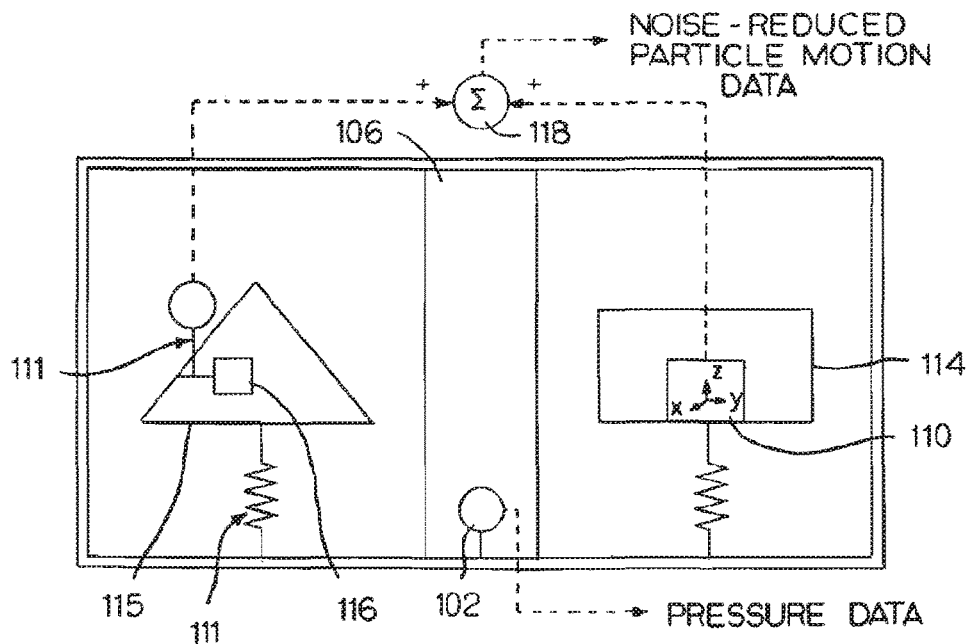
FIG. 16 is a schematic diagram of a seismic system according to still another embodiment.

A modified version of the seismic system of FIG. 15 may enhance the overall gain of the system as shown in FIG. 16. The first sensor 110 may behave acoustically and dynamically similar to or the same as the first sensor 100 of FIG. 15. In some embodiments, the second sensor 111 produces a response to pressure waves that matches the response of the first sensor 110 and a streamer-motion response equal in magnitude but opposite in polarity to that of the first sensor 110. The first housing 114 and the second housing 115 may be constructed similar to the first and second housings 104, 105 in FIG. 15, particularly in terms of acoustic cross-section and density, so that the first and second housings 114, 115 have a similar mass-spring response to cable motion, but a measurably different response to incident acoustic pressure waves.

The second housing 115 additionally includes a test mass 116 that may be configured or designed to oscillate in a fluid and have an acoustic wave response matching the response of the first housing 114. Alternatively or additionally, the response of the test mass to streamer motion may be substantially less than the response of the first and second housings 114, 115, because the test mass may be suspended in a fluid and the first and second housings 114, 115 may be mechanically coupled to the cable exterior. The test mass 116 may be non-rigidly or flexibly connected to the second housing 115 via a displacement, motion, acceleration sensor 111, or a combination thereof, which may use the second housing 115 as a frame of reference.

In one example, a cantilevered accelerometer, which may include piezoelectric materials, may be used as the motion sensor. Multiple accelerometers may be employed to form a tri-axis sensor, with each test mass calibrated to match the acoustic response of the first housing 114 along respective axes thereof. Pressure waves, which impart motion on the test mass 116 but, in some embodiments, not on the second housing 115, may be positively detected (i.e., in phase). Accordingly, in at least one example, pressure signals from the first sensor 110 and the second sensor 111 match in both magnitude and sign. Conversely, streamer vibrations, which influence the second housing 115 but not the test mass 116, may be negatively detected (i.e., opposite in phase). Hence, in some examples, vibration signals from the sensors may match in magnitude but may have opposite signs. The signals from the two sensors 110, 111 may thus be combined by addition at block 118, rather than subtraction, to produce a greatly diminished streamer-motion response and a simultaneous increase in gain of the acoustic wave response. Alternatively, another cantilevered test mass in the first housing 114 could be used. But, because the first sensor signal would also be reversed in polarity, it may need to be combined with the second sensor signal by subtraction rather than addition.

Figure 17:
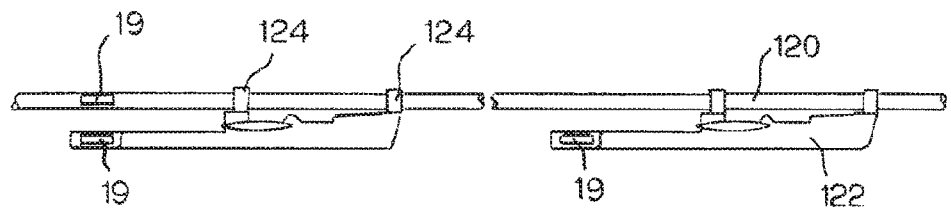
FIG. 17 is a side view of a seismic system according to an embodiment.
Figure 18:
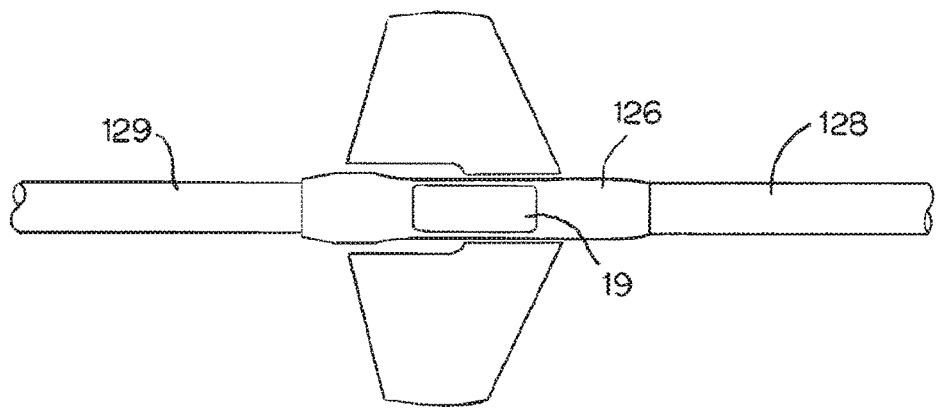
FIG. 18 is a side view of a seismic system according to an embodiment.

As shown in FIG. 17, the sensor portion of the seismic system 19 can be mounted within a streamer cable 120 or within a cable-positioning device, such as a cable-leveling or cable-steering bird 122, rotatably attached to the streamer by collars 124. As shown in FIG. 18, a cable-positioning device 126 connected in line between fore and aft streamer sections 128, 129 can house the sensor portion of the seismic system 19. Clearly, the sensors can be mounted in other devices attachable in, on, or to a streamer, an ocean-bottom cable, or an autonomous node.

A tri-axis accelerometer with response to dc similar to the VectorSeis sensor manufactured by ION Geophysical Corporation of Houston, Tex., U.S.A., is suitable for many embodiments of the disclosure. Since there is no dc component to the seismic wavelet, the dc response of the motion sensor is used to detect the orientation of the sensor relative to gravity. One axis of the sensor is designed to be in the known orientation of the streamer axis. Since the streamer axis orientation is known and the gravity vector is measured, the orientation of the sensor, and thus the arriving sensed seismic wavelet, can be electronically rotated relative to gravity so that up-going seismic wavelets can be accepted and down-going seismic wavelets rejected.

Any sensors that detect motion can be used. The sensors can be any motion sensors responsive to position, velocity, or acceleration. For instance, a gimbaled first geophone, as described by Tenghamn et al. in U.S. Pat. No. 7,239,577, can be combined with a second geophone, packaged so that it has little or no response to an acoustic wave and the same response to streamer motion, to achieve the desired result. Piezoelectric accelerometers can be used, as long as they have adequate sensor performance.

If the sensor cannot determine its own orientation, separate orientation sensors can be included in the sensor systems. Alternatively, mechanical means—such as a gimbal system—can be used to fix the sensors in a known orientation. Winged devices attached to the streamer, sometimes referred to as birds, can also be used to force the sensor into a desired orientation.

Figure 19A:
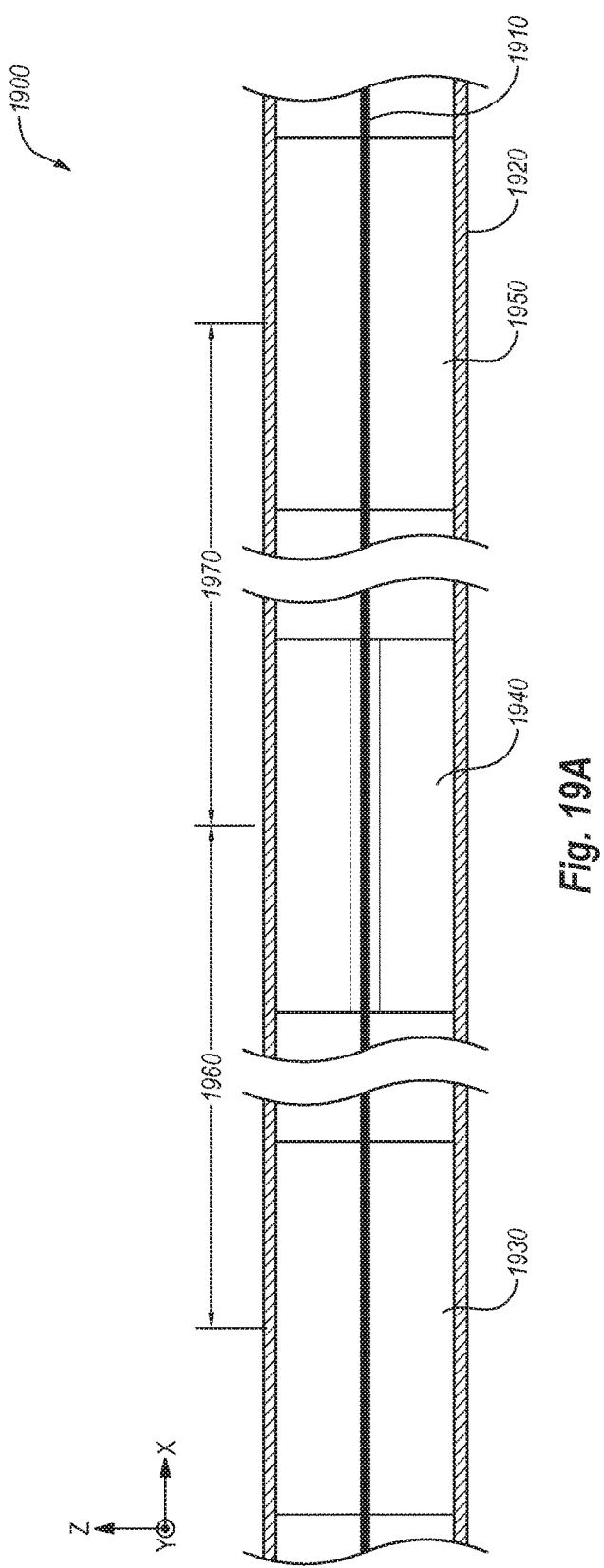
FIG. 19A is a schematic illustration of a portion of a streamer according to at least one embodiment.

In additional or alternative embodiments, the streamer or platform may include multiple motion sensors that may assist or facilitate filtering noise or readings of non-acoustic vibrations that may be present in the signal received from the streamer. For instance, as illustrated in FIG. 19A, a streamer 1900 may include a first elongated member, such as a cable or stress member 1910 and a second elongated member, such as a skin 1920. Collectively, the stress member 1910 and the skin 1920 may secure multiple sensors, as described in further detail below.

While the particular shape and size of the streamer 1900 may vary from one embodiment to the next, in some examples, the peripheral shape of the cross-section of the streamer 1900 may be defined by the skin 1920, which may at least partially enclose the stress member 1910. Furthermore, the streamer 1900 may have a generally elongated shape, such that a length of the streamer 1900 is substantially greater than the peripheral dimensions of the cross-sectional shape of the streamer 1900.

As noted above, in some instances, the stress member 1910 may be a rope, a cable, or a similar. For example, the stress member 1910 may be a rope of high strength fiber material. In one or more embodiments, the stress member 1910 may include a metal cable (e.g., a braded or multistrand cable), a solid cable, etc. Hence, in some instances, the stress member 1910 may be substantially flexible. Alternatively, however, in at least one embodiment, the stress member 1910 may be rigid and/or resilient. In any case, in some examples, the stress member 1910 and/or the skin 1920 may be placed in tension during operation of the streamer 1900 (e.g., the streamer 1900 may be advanced in a medium and may be tensioned thereby).

It should be also appreciated that while in some instances reference is made to a single stress member 1910, a streamer may include any suitable number of stress members (e.g., two, three, four, etc.), which may vary from one embodiment to the next. Similarly, the streamer 1900 may have a single skin 1920 that, in some embodiments, may surround the stress member 1910. Additionally or alternatively, however, a streamer may include multiple skins.

In at least one embodiment, the streamer 1900 may include multiple motion sensors. For example the streamer may include acoustic wave motion sensors, such as motion sensor 1940 and/or additional sensors, such as motion sensors, 1930, 1950. Suitable motion sensor may vary from one embodiment to another. Generally, the motion sensors 1930, 1940, or 1950 may include any of the following types of sensors: accelerometers, geophones, capacitive sensors, optical sensors, etc.

Also, any or all of the motion sensors 1930, 1940, 1950 may be a unidirectional or multidirectional sensor. For example, the motion sensors 1930, 1940, 1950 may sense vibration along transverse y-axis and/or z-axis, each oriented transversely relative to a longitudinal x-axis that is aligned longitudinally with the stress member 1910 and skin 1920. Additionally or alternatively, the motion sensors 1930, 1940, 1950 may sense vibration along the x-axis, y-axis, and/or z-axis of the streamer. Moreover, any one of the motion sensors 1930, 1940, or 1950 may be different from any other (e.g., different type, configuration, sensitivity ranges, etc.). For instance, the motion sensor 1930 and/or motion sensor 1950 may be different from the motion sensor 1940.

In some embodiments, the motion sensor 1930 and/or the motion sensor 1950 may be positioned and configured to sense vibration of the stress member 1910 (e.g., the motion sensor 1930 and/or the motion sensor 1950 may sense vibration of the stress member 1910 at or near locations of their respective positions). For instance, the motion sensor 1930 and/or motion sensor 1950 may be positioned along a length of the stress member 1910 and may sense vibration of the stress member 1910 at or near such positions. In an embodiment, the motion sensor 1930 and/or motion sensor 1950 may be less sensitive to vibrations of the skin 1920 than to vibrations of the stress member 1910. In one example, the motion sensor 1930 and/or motion sensor 1950 may be substantially insensitive to vibrations of the skin 1920, which may facilitate receiving readings or signal output from the motion sensor 1930 and/or motion sensor 1950 substantially representative of the vibration of the stress member 1910 (i.e., the motion sensor 1930 and/or motion sensor 1950 may be substantially unaffected by vibration of the skin 1920). Furthermore, in at least one embodiment, vibrations of the stress member 1910 may be non-acoustic vibrations (i.e., may substantially result from something other than acoustic waves or particle motion in the medium).

In additional or alternative embodiments, the motion sensor 1940 may be more sensitive to the vibrations of the skin 1920 and the surrounding medium than to the vibrations of the stress member 1910. For example, the motion sensor 1940 may be substantially isolated from and/or insensitive to vibrations of the stress member 1910. In one or more examples, while the motion sensor 1940 may be substantially isolated from the vibrations of the stress member 1910, such vibrations may affect or contaminate readings from the motion sensor 1940 (e.g., some vibrations from the stress member 1910 may be transferred to the motion sensor 1940). Generally, the motion sensor 1940 may be positioned at any suitable location on the streamer 1900. In some instances, the motion sensor 1940 may be positioned between the motion sensor 1930 and the motion sensor 1950 (e.g., longitudinally along the same streamer, such as along the streamer 1900). More specifically, examples may include motion sensor 1940 positioned at a midpoint between the motion sensor 1930 and the motion sensor 1950.

In any event, the streamer 1900 may include multiple motion sensors, such as motion sensors 1930, 1940, 1950, which may sense vibration of the stress member 1910 and/or skin 1920. Moreover, as described above, the motion sensor 1940 may more sensitive to acoustic waves, which may be transmitted from medium, through the skin 1920, than to non-acoustic waves (e.g., which may be transmitted along the stress member 1910). In some embodiments, the motion sensor 1940 may be sensitive substantially only to the acoustic waves. It should be appreciated that this disclosure is not limited to a specific number of motion sensors described above, and the number of motion sensors included in a streamer may vary from one embodiment to another.

In one or more embodiments, the streamer 1900 may move relative to and/or within a medium. For example, the streamer 1900 may be advanced in a medium such as water (e.g., the streamer 1900 may be towed by a marine vessel along one or more sail lines). Hence, during such relative motion of the streamer 1900 and the medium, the streamer 1900 may sense acoustic waves propagated through the medium. In some instances, the skin 1920 may be substantially transparent to the acoustic waves that propagate through the medium, such that the motion sensor 1940 may move or vibrate in response to movement of medium's particles produced by the acoustic waves. In other words, in some embodiments, the motion sensor 1940 may sense acoustic waves propagated in the medium.

Under some operational conditions, the motion sensor 1940 may sense vibration or movement of the stress member 1910 (e.g., stress member 1910 may impart vibration or movement onto the motion sensor 1940). Such vibration or movement sensed by the motion sensor 1940 may produce noise that may contaminate readings related to the acoustic waves. Consequently, filtering such noise may produce filtered acoustic wave readings that may represent acoustic waves more accurately than unfiltered readings.

Generally, the motion sensors 1930, 1940, 1950 as well as any number of additional or alternative sensors, including pressure sensors, orientation sensors, etc., may be positioned at any number of suitable locations on the streamer 1900. In one example, the motion sensor 1940 may be positioned between the motion sensor 1930 and motion sensor 1950 and may be separated by a distance therefrom along the streamer 1900. More specifically, in an embodiment, the motion sensor 1940 may be positioned at a distance 1960 from the motion sensor 1930 and at a distance 1970 from the motion sensor 1950 (e.g., as measured from imaginary centerlines or center points thereof). Also, in some instances, the distance 1960 may be similar to or the same as the distance 1970, such that the motion sensor 1940 is positioned approximately midway between the motion sensor 1930 and motion sensor 1950 (i.e., the sensors 1930 and 1950 are symmetrically positioned on each side of sensor 1940). In other embodiments, the motion sensors 1930, 1940, and 1950 may be positioned asymmetrically.

In some instances, positioning the motion sensor 1940 between the motion sensors 1930 and 1950 may facilitate calculating correction signals that may be used to modify unfiltered acoustic wave readings or signal output from the streamer 1900 (e.g., from the motion sensor 1940), which may include non-acoustic noise. More specifically, modifying unfiltered acoustic wave readings may produce filtered acoustic wave readings, which may more accurately represent actual acoustic waves. Hence, some embodiments may involve obtaining or receiving unfiltered acoustic wave readings from the motion sensor 1940 and combining correction signals therewith. In some examples, combining correction signals with the unfiltered readings may produce filtered acoustic wave readings that may be substantially free of the non-acoustic noise. As described below, the correction signals may be generated by combing first and second determined transfer functions with readings from the motion sensors 1930 and 1950.

Figure 19B:
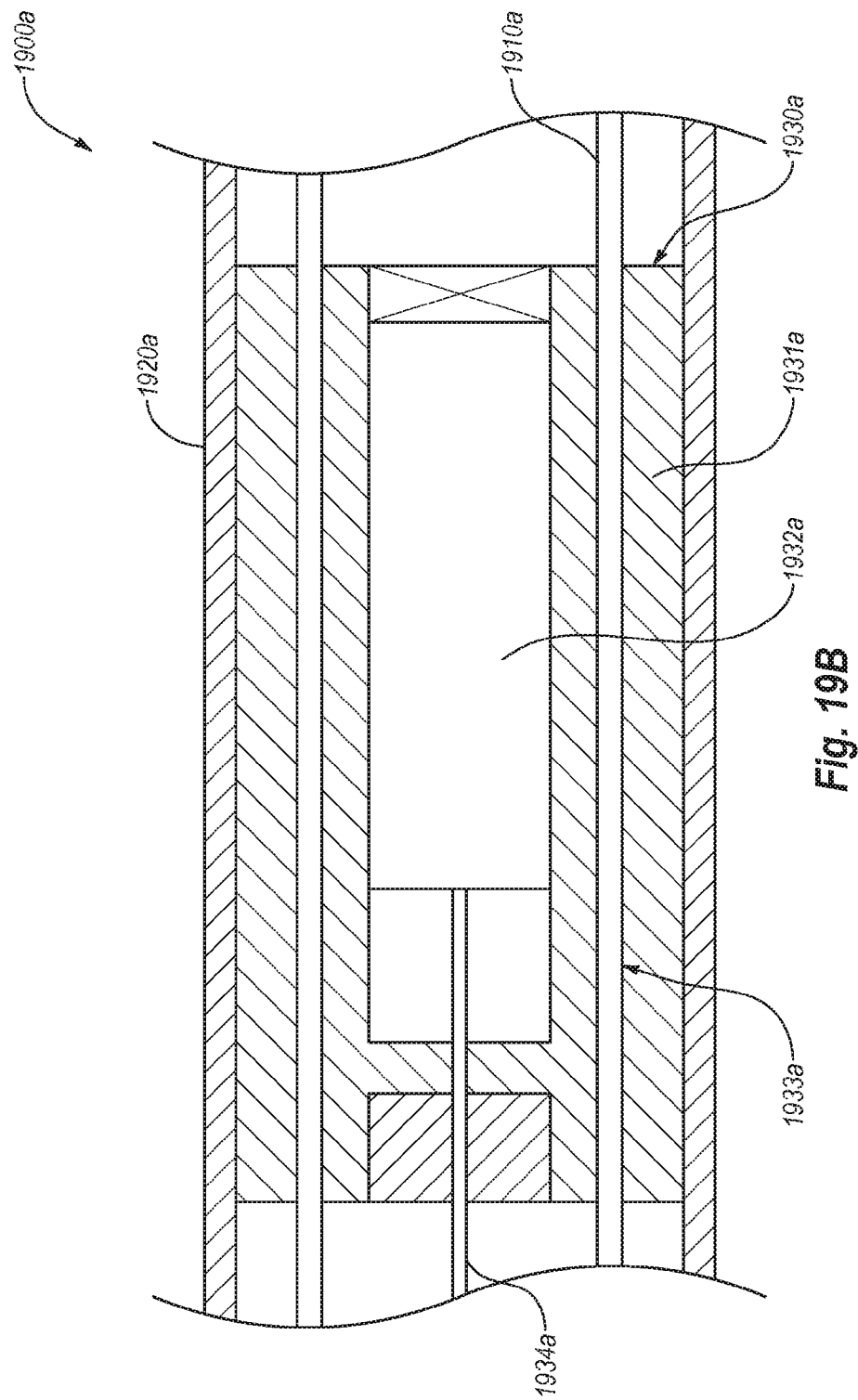
FIG. 19B is a cross-sectional view of a streamer including a motion sensor connected to a stress member of the streamer according to an embodiment.

In some embodiments, the motion sensor 1930 and/or motion sensor 1950 may move or vibrate together with the stress member 1910. Hence, the stress member 1910 may directly transfer vibration to the motion sensor 1930 and/or motion sensor 1950 that, in turn, may produce and/or modify an electrical signal that may provide information about the vibration, such as the amplitude and/or frequency of the vibration. For example, as illustrated in FIG. 19B, a streamer 1900a may include a motion sensor 1930a mechanically coupled or otherwise mounted to a stress member 1910a. In some instances, the motion sensor 1930a may be rigidly or fixedly attached to the stress member 1910a, such that the motion sensor 1930a may have the same or similar amplitude and/or frequency of vibration as the stress member 1910a at the location of attachment of the motion sensor 1930a to the stress member 1910a. In at least some embodiments, the rigid connection between the stress member 1910a and the motion sensor 1930a may be imperfectly rigid, such that the stress member 1910a and the motion sensor 1930a may have some amount of independent movement relative to each other.

For the sake of simplicity, FIG. 19B illustrates the motion sensor 1930a and a relevant portion of the streamer 1900a. It should be appreciated that, except as otherwise described herein, any of the motion sensors of the streamer 1900a (e.g., motion sensor 1950 (FIG. 19A)) may have the same or similar configuration and/or connection or coupling with the streamer 1900a as the motion sensor 1930a. Moreover, except as otherwise described herein, the motion sensor 1930a may be similar to or the same as the motion sensor 1930 (FIG. 19A).

In one embodiment, a rigid or inflexible connection between the motion sensor 1930a and the stress member 1910a may reduce or eliminate asynchronous movement of the motion sensor 1930a relative to the stress member 1910a. For instance, the motion sensor 1930a may include a housing 1931a that may secure or house sensing components 1932a (e.g., one or more accelerometers). In some examples, the housing 1931a (or another portion of the motion sensor 1930a) may include openings 1933a that may accommodate the stress member 1910a therein. In particular, the openings 1933a may be tightly or snuggly fitted about the stress member 1910a.

In one or more embodiments, the stress member 1910a may be press-fit or interference fit in the openings 1933a. Additionally or alternatively, the stress member 1910a may be glued or otherwise adhered to the motion sensor 1930a within the openings 1933a. In some instances, the stress member 1910a may be fastened to the motion sensor 1930a

(e.g., with one or more fasteners, such as screws). Generally, the motion sensor 1930a may include or comprise any suitable material, which may vary from one embodiment to the next. For instance, the motion sensor 1930a may include a plastic housing 1931a. Hence, depending on the particular materials of the motion sensor 1930a and/or stress member 1910a, in some examples, the motion sensor 1930a may be welded to the stress member 1910a (e.g., a plastic housing 1931a may be ultrasonically welded to a stress member 1910a).

Embodiments may include the motion sensor 1930a fixedly or rigidly secured to the stress member 1910a or otherwise associated therewith to sense vibrations thereof.

Also, in at least one embodiment, the motion sensor 1930a may be less sensitive or less responsive to the vibration of the skin 1920a, and in some embodiments, substantially insensitive thereto. For example, the motion sensor 1930a may be spaced apart from the skin 1920a, such that the skin 1920a does not substantially contact the motion sensor 1930a (e.g., as the skin 1920a vibrates while affected by acoustic waves in the medium). In other embodiments, and as shown in FIGS. 19A and 19B, the skin 1920a is in contact with the motion sensor 1930a, and may be glued or otherwise coupled to a housing for the motion sensor 1930a.

As mentioned above, in some embodiments, the skin 1920a may surround the stress member 1910a. For instance, the skin 1920a may have a generally tubular or otherwise hollow shape. Hence, the motion sensor 1930a may be positioned inside the skin 1920a.

As described in further detail below, the sensing components 1932a of the motion sensor 1930a may be operably coupled to one or more processing devices (e.g., signal processor, controller, etc.). In particular, in some embodiments, the processing device may receive readings or signal output from the sensing components 1932a of the motion sensor 1930a. Hence, in one example, the motion sensor may include an electrical cable 1934a, which may electrically couple the sensing components 1932a to the processing device.

Figure 19C:
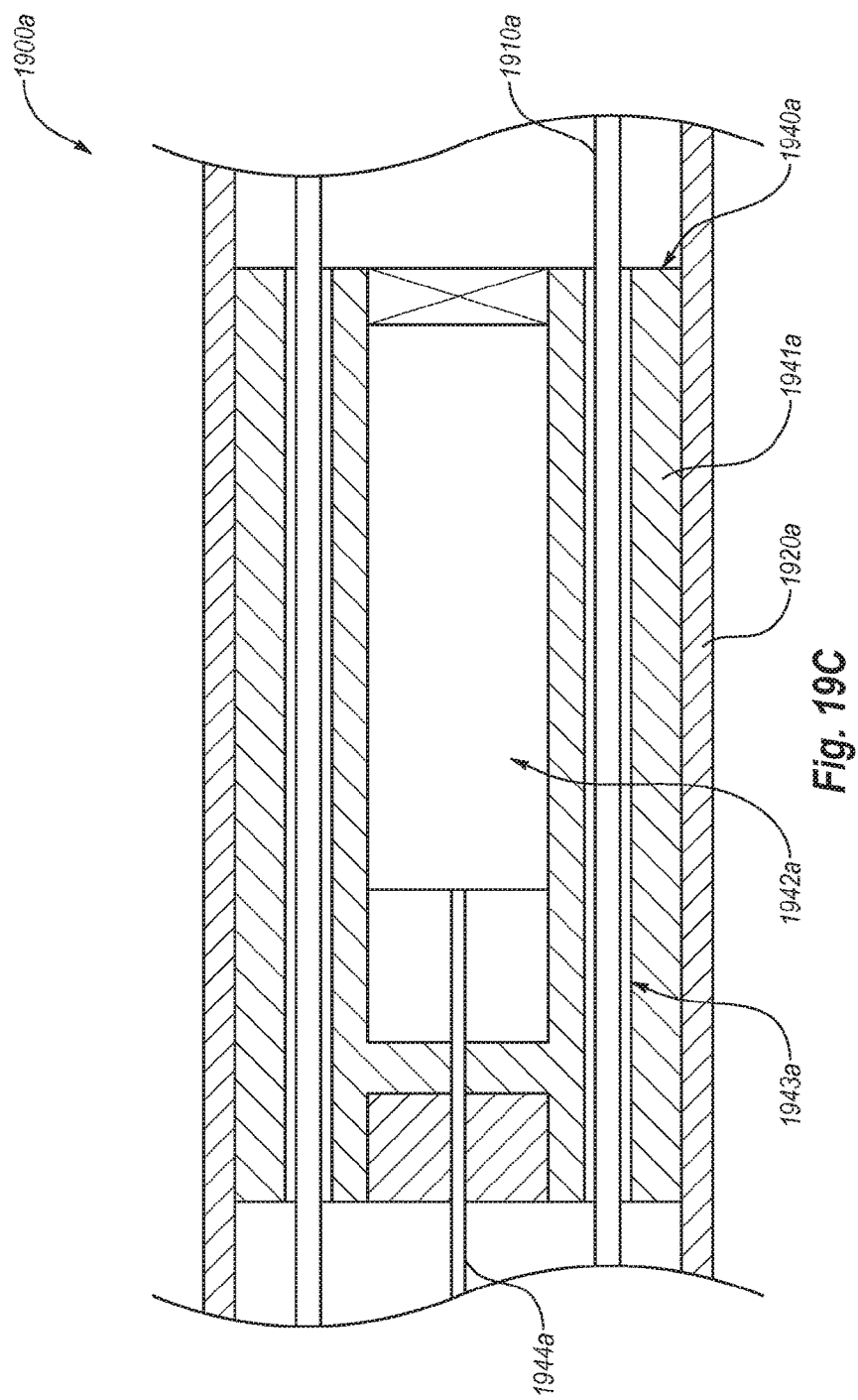
FIG. 19C is a cross-sectional view of a streamer including another motion sensor isolated from a stress member of the streamer according to an embodiment.

As mentioned above, the motion sensor 1940 (FIG. 19A) may be positioned and/or configured to be more sensitive to vibrations of the skin than vibrations of the stress member. For instance, as shown in FIG. 19C, a streamer 1900a may also include a motion sensor 1940a that may be more sensitive to the vibration of the skin 1920a than vibration of the stress member 1910a. In some examples, as described in further detail below, the motion sensor 1940a may be positioned along the streamer 1900a at a distance from the motion sensor 1930a (FIG. 19B).

In some embodiments, the motion sensor 1940a may be in contact with and/or mechanically coupled to the skin 1920a, such that acoustic vibration transmitted in the medium may be sensed by the motion sensor 1940a. For instance, the skin 1920a may be stretched over a housing 1941a of the motion sensor 1940a (e.g., the skin 1920a may be elastically stretched over and/or glued to the motion sensor 1940a in a manner that prevents or limits movement of the motion sensor 1940a relative to the skin 1920a). Furthermore, the motion sensor 1940a may be attached or otherwise secured to the skin 1920a in a manner that movement of the skin 1920a and/or particles of the medium induce corresponding movement of the motion sensor 1940a.

Similar to the motion sensor 1930a (FIG. 19B), in one example, the motion sensor 1940a shown in FIG. 19C may include one or more sensing components 1942a, which may sense motion or acceleration of the motion sensor 1940a. For instance, the sensing components 1942a may be secured inside the housing 1941a of the motion sensor 1940a. Also, in some embodiments, the housing 1941a of the motion sensor 1940a may include openings 1943a that may allow the stress member 1910a to pass therethrough.

In at least one embodiment, the openings 1943a may have sufficient or suitable clearance relative to the stress member 1910a. For example, the clearance between the openings 1943a and the stress member 1910a may prevent or limit contact between the stress member 1910a and the motion sensor 1940a during vibration of the stress member 1910a. Consequently, the motion sensor 1940a may be more sensitive or responsive to the vibration of the skin 1920a than vibration of the stress member 1910a.

As described above, unfiltered readings of acoustic waves sensed by the streamer may be processed to remove non-acoustic noise. For example, referring back to FIG. 19A, the streamer may include a motion sensor (e.g., motion sensor 1940) that senses acoustic waves through the skin of the streamer but may also be affected by vibrations from another source of non-acoustic vibration (i.e., noise). In some instances, non-acoustic vibrations readings may be vibrations of the stress members, which may contaminate the readings of the acoustic waves. Accordingly, correction signals may be used to modify the unfiltered readings of the acoustic waves in a manner that may reduce or eliminate noise from the unfiltered readings.

In some embodiments, correction signals may be calculated by obtaining transfer functions of the vibrations propagating along the stress member(s) between the motion sensors most sensitive to such vibration, such as, motion sensors 1930, 1950, and the motion sensor responsible for sensing the acoustic waves, such as motion sensor 1940. In particular, in an embodiment, the stress member may be vibrated in a manner that the vibrations propagate along the length thereof (with the vibrations being transverse to the length of the stress member in some embodiments) from the sensors sensitive to the vibration of the stress members, such as motion sensors 1930 and/or 1950 to the sensor being more sensitive to the acoustic waves than vibration of the stress member, such as motion sensor 1940.

As described in further detail below, the sensing components 1942a of the motion sensor 1940a may be operably coupled to a processing device. In particular, in some embodiments, the processing device may receive readings or signals output from the sensing components 1942a of the motion sensor 1940a. Hence, in one example, the motion sensor may include an electrical cable 1944a, which may electrically couple the sensing components 1942a to the processing device.

Figure 20:
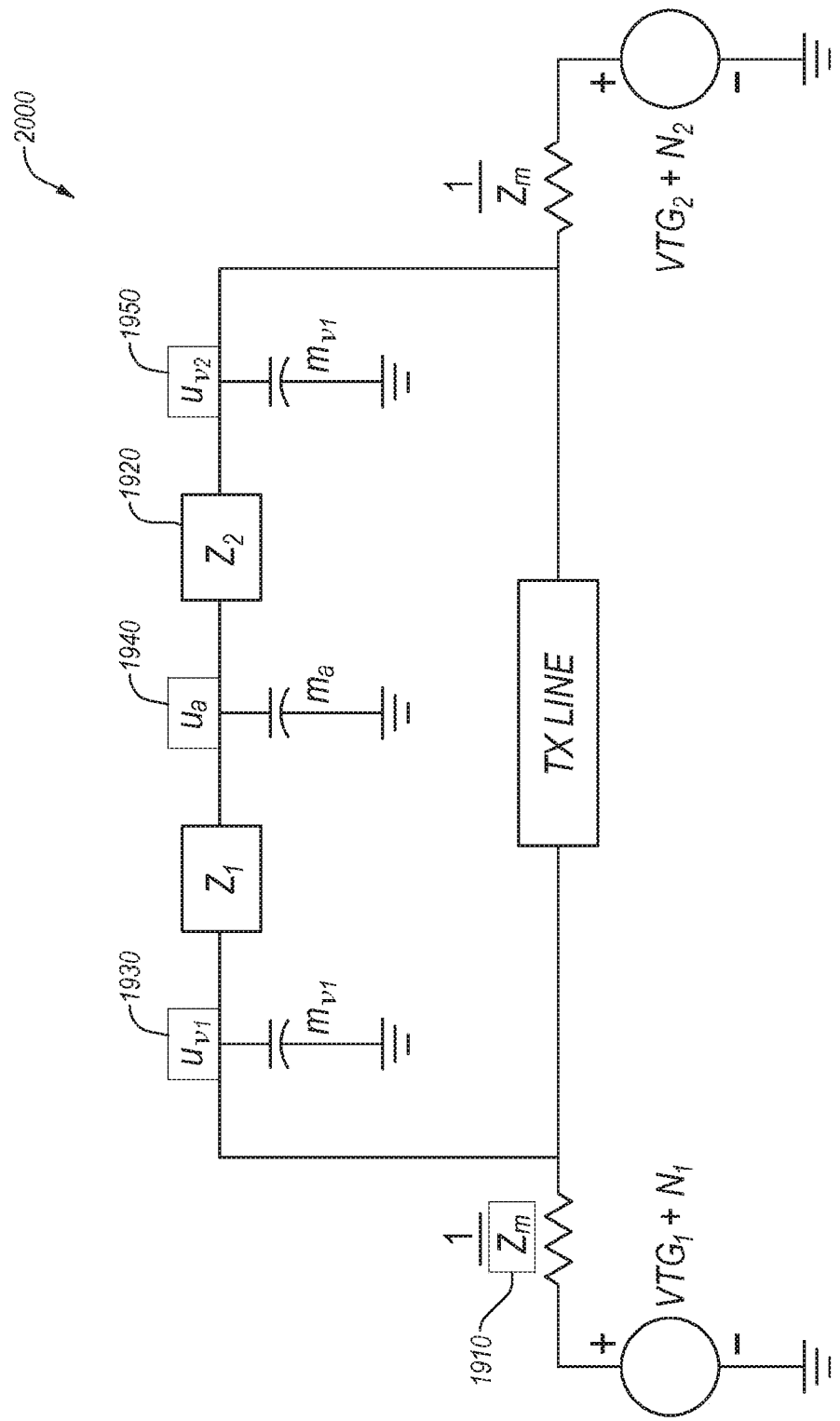
FIG. 20 is a diagram of an equivalent circuit modeling behavior of elements and/or components of a streamer according to an embodiment.

FIG. 20 illustrates a schematic representation of a circuit 2000 that, in some embodiments, models the behavior of the stress member 1910 and skin 1920 as well as motion sensors 1930, 1940, 1950 (FIG. 19A). For ease of reference, electrical components and elements of the circuit 2000 are also identified with reference numbers that correspond to the elements or component of the streamer 1900 (FIG. 19A), whose behavior such electrical components may model. For example, behavior of elements $u_{v1}$ and $u_{v2}$ in the circuit 2000 may correspond to readings or behavior of the motion sensors 1930 and 1950, respectively, in the streamer 1900.

In some embodiments, elements $u_{v1}$ and $u_{v2}$ may include respective capacitors $m_{v1}$, $m_{v2}$ connected thereto modeling masses of the sensors 1930, 1950. Similarly, the motion sensor 1940 may be represented by the element $u_a$, which may include a capacitor $m_a$ connected thereto modeling a mass of the sensor 1940. In one embodiment, the skin 1920 may be represented by impedance values $Z_1$, $Z_2$ and the stress member 1910 may be represented by impedance values $Z_m$ that represent impedance properties of the circuit 2000 at the illustrated locations thereon. It should be also noted that, generally, elements of the streamer 1900 may be represented according to generally accepted conventions in dynamic modeling (e.g., masses may be represented as capacitors, springs as inductors, dashpots as resistors, stress members as impedances, velocity as voltage, force as current, etc.).

In some embodiments, the stress members 1910 may be vibrated (e.g., artificially) at one or more suitable locations. In some instances, introduced vibration may facilitate determining or calculating correction signals that may be used to correct unfiltered readings of acoustic waves (i.e., readings of the motion sensor 1940). For example, the vibration may be first introduced at a first point on the stress member 1910. More specifically, in an embodiment, the motion sensor 1930 may be positioned between the first point and the motion sensor 1940. In other words, the introduced vibration may propagate along the stress member 1910 from the first point to the motion sensor 1930 and, subsequently, to the motion sensor 1940 and to the motion sensor 1950.

Similarly, the stress member 1910 may be vibrated at a second point, such that vibration propagates from the second point to the motion sensor 1950 and, subsequently, to motion sensor 1940 and to the motion sensor 1930. Accordingly, introducing vibration at the first and second points may facilitate calculating or obtaining a first transfer function from the motion sensor 1930 to the motion sensor 1940 and a second transfer function from the motion sensor 1950 to the motion sensor 1940. As described below in further detail, the first and second transfer functions may be used to obtain correction signals that, in turn, may be used to filter noise from unfiltered readings of acoustic waves received or obtained from the motion sensor 1940.

In at least one embodiment, vibrations at the first and second points on the stress member 1910 may be introduced artificially. For instance, one or more vibration sources that, in some embodiments, may be operably connected (e.g., mechanically coupled) to the stress member 1910 and may introduce such artificial vibrations into the stress member 1910. Moreover, in some examples, a first vibration source may be connected at or near the first point of the stress member 1910 and a second vibration source may be connected at or near the second point of the stress member 1910. As such, the first vibration source may be turned on to obtain first readings and may be turned off thereafter. Similarly, the second vibration source may be turned on to obtain second readings and may be turned off thereafter. The first readings and the second readings are used to compute the first and second transfer functions. The circuit 2000 models the first and second vibration sources as AC voltage sources $VTG_1$ and $VTG_2$, respectively.

Additionally or alternatively, vibrations could be introduced to the streamer skin, to both the skin and the stress member, or generally to any one or more of the streamer components. It should be appreciated that locations of the vibration sources and motion sensors 1930, 1940, 1950 are given as examples. The streamer may include any suitable number of motion sensors and/or vibration sources, which may be positioned at any number of suitable locations along the streamer (e.g., along the stress member 1910, skin 1920, or other components of the streamer).

In addition to vibration sources, which may vibrate the stress member 1910 (e.g., at the first and second points), the stress member 1910 may also experience environmental or natural vibration (i.e., vibrations not caused by the vibration sources), which may originate at and/or propagate from the same points as the vibration produced by the vibration sources, which may be at a predetermined frequency and/or amplitude. Natural vibrations may result from or may be caused by the movement of the streamer through the medium, vibrations from a vehicle advancing the streamer (e.g., vibrations from a vessel or its motor), and so forth. Such natural vibrations may be added to the vibrations artificially induced by the vibration sources. On the circuit 2000, natural vibrations are modeled as AC voltage sources $N_1$ and $N_2$.

The circuit 2000 may facilitate calculating or determining one or more transfer functions. In some examples, the transfer function $H_v$ may be represented as:

$$H_v = \frac{1/sm_a}{1/sm_a + Z_{Th}} = \frac{1}{1 + sm_a Z_{Th}}$$

where $$Z_{Th} = Z_1 Z_2 / (Z_1 + Z_2)$$

$m_a$ is the mass of motion sensor 1940, s is the Laplace transform variable.

In one example, the circuit 2000 may be represented by a system of equations in the frequency domain as follows:

$$U_{1a} = U_{1v1} G_1 H_v + U_{1v2} G_2 H_v \qquad \text{Equation 1:}$$

$$U_{2a} = U_{2v1} G_1 H_v + U_{2v2} G_2 H_v \qquad \text{Equation 2:}$$

$$G_2 = 1 - G_1 \qquad \text{Equation 3:}$$

where a first transfer function from $u_{v1}$ to $u_a$ is represented by $G_1 H_v$ and a second transfer function from $u_{v2}$ to $u_a$ is represented by $G_2 H_v$, and $G_1$ and $G_2$ are defined as follows:

$$G_1 = \frac{Z_2}{Z_1 + Z_2}$$

$$G_2 = \frac{Z_1}{Z_1 + Z_2}$$

The above system of equations may be solved for $G_1$, $G_2$, and $H_v$ in the frequency and/or in the time domain in some embodiments. A sample solution is provided below. In some instances, $g_1$ and $g_2$ are constants close to 0.5.

As described above, vibrating the stress member 1910 (and/or the skin 1920 or other streamer components) by the first and/or second vibration sources may facilitate obtaining transfer functions for filtering noise from the readings of the motion sensor 1940. For example, the readings from motion sensor 1940 may be filtered using the following time domain correction equation:

$$u = u_a - u_{v1} * g_1 h_v - u_{v2} * g_2 h_v$$

where u is the filtered reading of acoustic vibrations and the operation * is convolution in the time domain. In this equation, the correction signals $u_{v1} * g_1 h_v$ and $u_{v2} * g_2 h_v$ may be subtracted from the reading received or obtained from the motion sensor 1940, which is represented in the circuit 2000 by $u_a$.

As such, in some embodiments, correction signals may depend on or may be based on the readings received from the motion sensor 1930 and/or motion sensor 1950. More specifically, readings received from the motion sensor 1930 and/or motion sensor 1950 may be modified (e.g., using the transfer functions described above) to obtain correction signals, which may be subtracted from the readings received from the motion sensor 1940. Moreover, such modifications or filtering of the readings received from the motion sensor 1940 may occur substantially in real time in some but not all embodiments. For instance, as described below in further detail, a processing device may receive readings from the motion sensors 1930, 1940, 1950 and may continuously filter the acoustic wave readings (e.g., readings from the motion sensor 1940) in a manner described above after the transfer functions have been determined.

Figure 21:
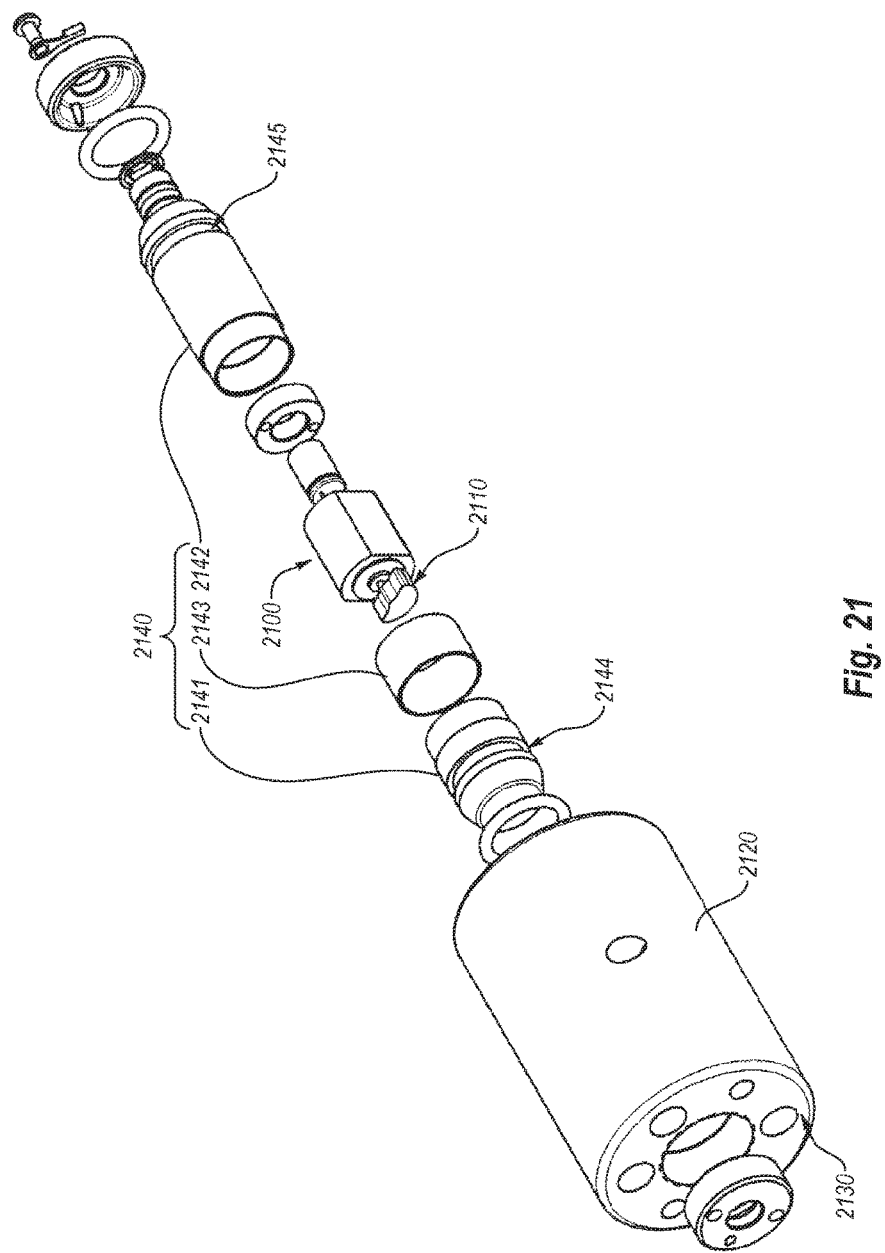
FIG. 21 is an exploded view of a vibration source according to an embodiment.

Any number of suitable vibration sources may be used to vibrate the stress member and/or other suitable portions of the streamer during a characterization operation, in a manner that facilitates obtaining the one or more transfer functions. In some embodiments, the vibration source may be a motor with an eccentrically loaded shaft. An example of a suitable motor assembly is illustrated in FIG. 21. As shown in FIG. 21, a motor 2100 may include an eccentric mass 2110 that may be secured to or integrated with the shaft of the motor 2100. Accordingly, during rotation, the shaft may be unevenly loaded, which may induce vibration in the streamer in one or more dimensions, with such induced vibrations being greater, and in some embodiments much greater than vibrations caused by environmental forces such as the strumming of the streamer caused by towing the streamer behind a vessel.

In some examples, the vibration of the motor 2100 may be approximately perpendicular or transverse to a rotation axis of the shaft. Consequently, orienting the rotation axis of the shaft of the motor 2100 approximately longitudinally or along a length of the streamer and/or the stress member may vibrate the stress member transversely relative to the length thereof (e.g., in the crossline and depth directions of the streamer). More specifically, in some embodiments, the motor 2100 may be coupled or secured to the stress member in a manner that vibration of the motor 2100 is transferred to the stress member (e.g., at the location of attachment of the motor 2100 to the stress member). Also, securing the motor 2100 to the stress member in a manner that the rotation axis of the shaft is perpendicular to the stress member may produce vibrations along the length of the stress member. Hence, the streamer may include one or more vibration sources, such as the motor 2100, that may vibrate the stress member along x-axis, y-axis, z-axis (FIG. 19A) or any combination thereof. In some embodiments, 1, 2, or 3 vibration sources may be used to induce vibrations along 1, 2, or 3 axes or dimensions of the streamer.

The motor 2100 may be included in a motor assembly, which may couple (e.g., secure) the motor 2100 to one or more stress members, or otherwise associate the motor to the streamer in order to transmit vibration created by the motor to the stress member(s) and/or other components of the streamer. For instance, the motor 2100 may be secured within a housing 2120 that may be secured to the stress members. In some embodiments, the housing 2120 may include one or more openings 2130 that may receive the corresponding stress members. More specifically, in at least one embodiment, the openings 2130 may be secured to the stress members in the same or similar manner as described above in connection with the housing 1931*a* (FIG. 19B).

In some instances, vibrations produced by the motor 2100 in the stress member may correspond to the revolutions per minute (RPM) of the motor 2100. Moreover, in one example, the RPM of the motor 2100 may be related to the voltage applied thereto (e.g., DC voltage). Consequently, varying the voltage applied to the motor 2100 may vary the vibrations produced by the motor 2100 in the stress member. In some embodiments, the motor 2100 may be configured to vibrate the stress member at frequencies between 1 Hz and 300 Hz. Consequently, during calibration of the streamer, the motor 2100 may vibrate the stress member at any number of suitable frequencies such as, 10 Hz, 50 Hz, 100 Hz, 200 Hz, etc. In one embodiment, the motor 2100 may be configured to generate vibrations including a sweep of a plurality of vibration frequencies, which may sweep from 200 Hz down to 8 Hz in one specific example.

Additionally or alternatively, the motor 2100 may be positioned or located inside a holder 2140, which may include a first, second, and third portions 2141, 2142, 2143. The holder 2140 together with the motor 2100 may be secured inside an opening or a cavity in the housing 2120. The holder 2140 may seal the motor 2100 therein in a manner that prevents or limits a medium from coming into contact with and/or damaging the motor 2100 and/or components thereof. For example, O-rings may be positioned in the grooves 2144 and 2145 and may seal against the cavity in the housing 2120 that houses the holder 2140, thereby presenting or limiting the medium from entering the cavity in the housing 2120 and/or the spaces between the first, second, and third portions 2141, 2142, 2143.

In some embodiments, the holder 2140 may be sealed inside the cavity of the housing 2120. For instance, the holder 2140 may facilitate electrical connection to the motor 2100. Hence, sealing the holder 2140 together with the motor 2100 in the cavity of the housing 2120 may also protect or seal the electrical connections to the motor 2100 from the medium inside the streamer or in which the streamer may be at least partially submerged.

While FIG. 21 and corresponding text relate to a motor, which may be a DC motor, it should be appreciated that this disclosure is not so limited. For instance, the motor may be an AC motor, and the RPM of the AC motor may be controlled by controlling the frequency of the current applied thereto. Also, in some embodiments, the vibration source may include a linear actuator that may move (e.g., cyclically) one or more points of the stress member to produce vibration along any one or more of the x-axis, y-axis, z-axis, or any combination thereof. Suitable vibration sources may also include mechanical sources such as a tuning fork or a similar mechanism that may vibrate the stress member at a predetermined frequency. In any event, the vibration source may produce vibration at one or more points on the stress member, which may facilitate determining one or more transfer functions for use in filtering non-acoustic vibrations sensed by the streamer.

Furthermore, in some instances the streamer may be calibrated (i.e., characterized) prior to acquiring acoustic wave data, such as at the beginning of a sail line before the seismic sources are activated. For example, the streamer may be advanced in the medium and transfer functions may be obtained immediately before receiving acoustic wave readings from the streamer, which may be modified or corrected by the correction using the one or more transfer functions, as described above. Alternatively, the streamer may be pre-calibrated (e.g., by a manufacturer) and transfer functions may be obtained in advance. Subsequently, the streamer may be at least partially submerged in a medium and/or moved therethrough to receive unfiltered readings of acoustic waves, which may be modified or corrected by the correction signals obtained from the transfer functions that may be provided by the manufacturer.

Vibration sources, such as motor 2100, may additionally be used for other streamer quality control operations in some embodiments. For example, vibration sources may be used for one or more built in self-test (BIST) procedures of other streamer components that respond to streamer vibration, or may be used for periodic calibration of other streamer components that respond to streamer vibration.

Figure 22:
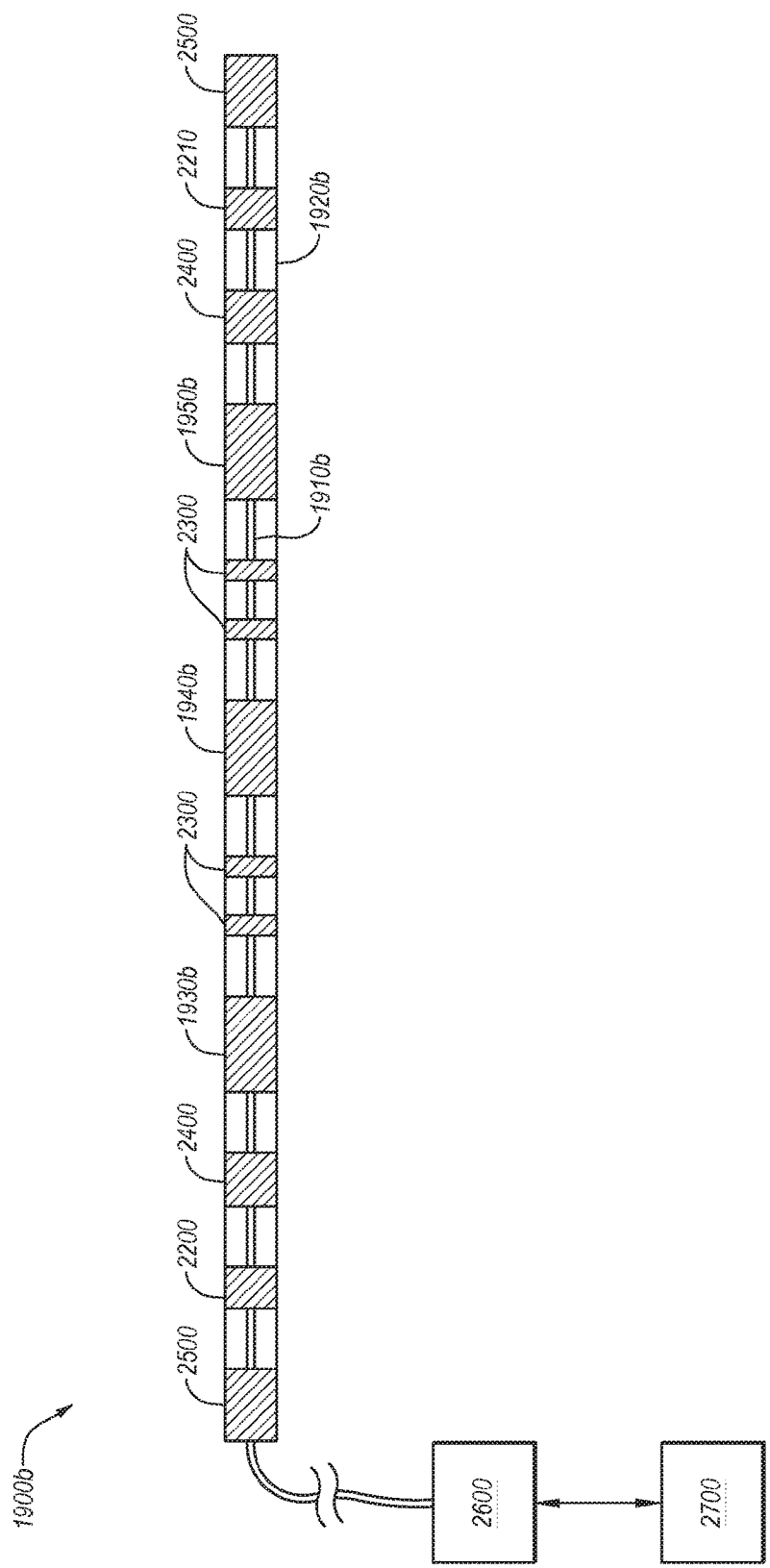
FIG. 22 is a schematic illustration of a streamer, signal processor, and a controller according to an embodiment.

FIG. 22 illustrates a streamer 1900b according to one embodiment. Except as otherwise described herein, the streamer 1900b and its elements or components may be similar to or the same as any of the streamers 1900, 1900a (FIGS. 19A-19C) and their respective elements and components. For example, the streamer 1900b may include a stress member 1910b and a skin 1920b that may be similar to or the same as stress member 1910 and skin 1920 in FIG. 19A.

In some embodiments, the streamer 1900b may also include motion sensors 1930b, 1940b, 1950b. The motion sensors 1930b, 1940b, and 1950b may have similar locations on the streamer 1900b as the motion sensors 1930, 1940, 1950 on the streamer 1900 (FIG. 19A). Moreover, in some instances, the motion sensors 1930b, 1940b, 1950b may be secured or otherwise coupled to the streamer 1900b in a similar or the same manner as the motion sensors 1930, 1940, 1950 are coupled to the streamer 1900 in FIG. 19A. The streamer 1900b may include one or more vibration sources, as described above. For example, the streamer 1900b may include a first vibration source 2200 and a second vibration source 2210, each of which may be coupled to the stress member 1910b and/or other streamer components. As such, in at least one embodiment, the first vibration source 2200 may vibrate the stress member 1910b and in a manner that the vibration propagates from the first vibration source 2200 toward the motion sensor 1930b and further toward motion sensor 1940b and, in some embodiments, on towards motion sensor 1950b. Likewise, second vibration source 2210 may vibrate the stress member 1910b and in a manner that the vibration propagates from the second vibration source 2210 toward the motion sensor 1950b and further toward motion sensor 1940b and, in some embodiments, on towards motion sensor 1930a. As noted above, vibrations produced by the first and/or second vibration sources 2200, 2210 may be transverse relative to the length of the stress member 1910b (e.g., in the crossline and depth dimensions relative to the streamer).

In some examples, the streamer 1900b may also include one or more buoyancy devices, such as buoyancy devices 2300. In at least one embodiment, the skin 1920b may be secured or coupled to the buoyancy devices 2300. Moreover, the buoyancy devices 2300 may be isolated or otherwise decoupled from the stress member 1910b according to one or more embodiments. In any event, the buoyancy devices 2300 may facilitate positioning the streamer 1900b at least partially within the external medium at a predetermined depth. For instance, the streamer 1900b may be secured to a vessel or other marine vehicle that may advance the streamer 1900b in a body of water. The buoyancy devices 2300 may float or position the streamer 1900b at a desired depth relative to the surface of the water during advancement of the streamer 1900b.

In one or more embodiments, the streamer 1900b may also include one or more hydrophones 2400 that may be configured to measure a pressure wave in the medium. In one example, the response of the hydrophones 2400 may be omnidirectional. Furthermore, the streamer 1900b may include one or more cable connectors 2500 that may be secured or connected to the stress member 1910b and/or to the skin 1920b. Additionally or alternatively, the cable connectors 2500 may secure the streamer 1900b to a vehicle (e.g., a vessel) that may advance or tow the streamer 1900b in the medium, or other streamer section.

In some embodiments, the streamer 1900b may be electrically coupled to one or more processing devices, such as a signal processor 2600 and/or to a controller 2700. More specifically, the signal processor 2600 may receive data or information from the motion sensors 1930b, 1940b, 1950b. The signal processor 2600 may also receive data or information from the hydrophones 2400. In some instances, the signal processor 2600 may calculate suitable correction signals (e.g., using the determined one or more transfer functions) and/or modify readings received from the streamer 1900b with one or more correction signals to produce filtered acoustic wave readings.

Additionally or alternatively, the signal processor 2600 and/or the controller 2700 may control and/or operate the vibration sources 2220 and 2210 to vibrate the stress member 1910b. For instance, the signal processor 2600 and or the controller 2700 may turn on and/or off the vibration sources 2200, 2210, may control the frequency and/or amplitude of the vibration produced by the vibration sources to 2200, 2210, etc. Hence, in some embodiments, the signal processor 2600 and/or controller 2700 may automatically calibrate the streamer 1900b by, for example, calculating or obtaining one or more transfer functions for use in generating the correction signals. It should be appreciated that, while the signal processor signal processor 2600 and the controller 2700 are described and illustrated as separate elements, in at least one embodiment, the signal processor 2600 and the controller 2700 may be included in a single element, which may perform the functions or acts described herein.

Moreover, the signal processor 2600 and/or the controller 2700 may include a general purpose or a special purpose computer or computing device including computer hardware, such as one or more processors and system memory. Some embodiments include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, some embodiments can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs"), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module, and then eventually transferred to computer system RAM and/or to less volatile computer storage media (devices) at a computer system. Thus, it should be understood that non-transitory computer-readable storage media (devices) can be included in computer system components that also utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Hence, in some embodiments, the signal processor 2600 and/or controller 2700 may include computer-executable instructions that may cause the signal processor 2600 and/or controller 2700 to perform one or more acts or functions described herein.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

According to some embodiments, the signal processor 2600 and/or controller 2700, whether configured as a single component or multiple components and whether configured as a special purpose computer or a general purpose computer, may receive vibration information from the motion sensors 1930b, 1940b, 1950b during the calibration of the streamer 1900b. Moreover, the signal processor 2600 and/or the controller 2700 may receive or determine one or more transfer functions and correction signals, which may be used to correct or modify the readings of the motion sensor 1940b to produce filtered readings of the acoustic waves, which may better represent the actual acoustic waves (as compared with unfiltered readings) and/or which may be substantially free of non-acoustic noise.

Figure 23:
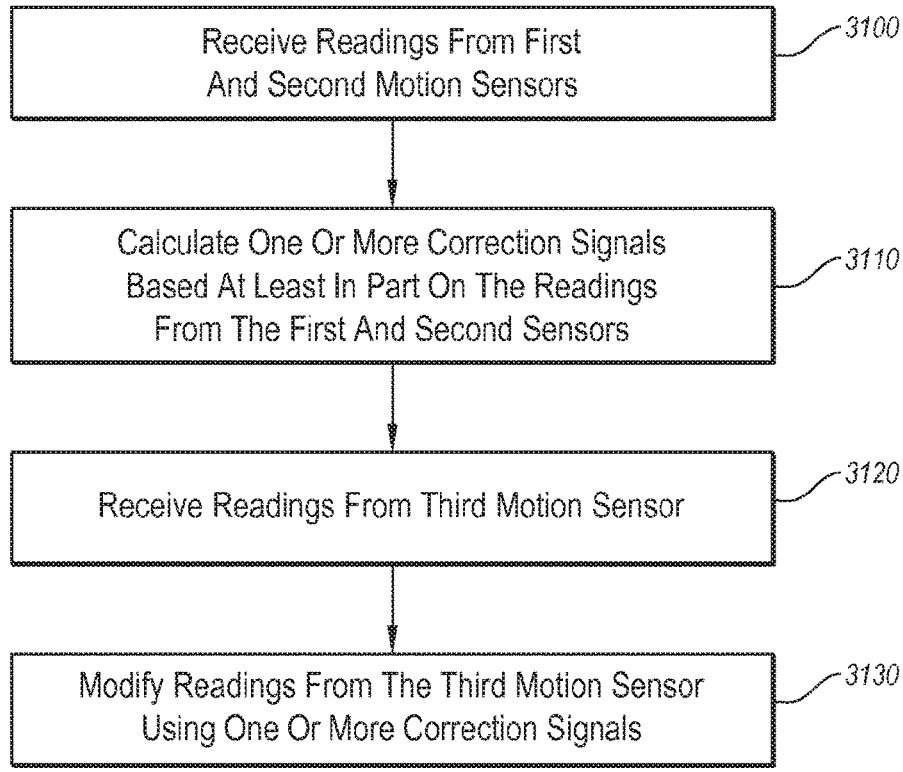
FIG. 23 is a chart of acts for filtering readings of a streamer according to an embodiment.

It should be appreciated that this disclosure is not limited to using a signal processor 2600 and/or controller 2700 to perform acts and/or functions described herein. For instance, any suitable processing device may be electrically coupled to one or more streamers to perform the acts and/or functions described herein. Accordingly, for example, one or more processing devices may perform one or more acts illustrated in FIG. 23.

More specifically, in at least one embodiment, the processing device may perform an act 3100 of receiving readings from first and second motion sensors corresponding to vibrations introduced by an artificial vibration source. For instance, the signal processor and/or the controller may receive signals from motion sensors that are sensitive to the vibration of the stress member (e.g., motion sensor 1930, motion sensor 1940, and/or motion sensor 1950 (FIG. 19A)). The signal processor and/or the controller may also receive readings from additional motion sensors (e.g., other ones of the motion sensors 1930, 1940, and 1950).

The processing device may then perform an act 3110 of calculating one or more correction signals based at least in part on the readings from the first and second sensors. In some embodiments, a correction signal may be calculated using the transfer function derived from the readings of the first and second sensors in act 3100. For example, a correction signal may be calculated using subsequent readings from the motion sensor 1930 (i.e., readings obtained after those obtained in act 3100) and the transfer function as described above.

In act 3120, the processing device may receive readings from a third motion sensor, such as motion sensor 1940 in FIG. 19A. Then, in act 3130, the processing device may modify readings from the third motion sensor using one or more correction signals calculated in act 3110. For example, readings from the motion sensor 1940 (FIG. 19A) may be modified using one or more correction signals determined based on the readings from the motion sensor 1930 (FIG. 19A) (e.g., readings obtained contemporaneously with the readings from the motion sensor 1940 in act 3120) and the one or more determined transfer functions. For example, the one or more correction signals may be subtracted from the readings of the motion sensor 1940 (FIG. 19A). As suggested above, in some embodiments, the act 3100 may include receiving readings from two, three, or more motion sensors, such as 1930, 1940, and 1950, and one or more transfer functions may be calculated based at least in part on the readings received from these two, three, or more motion sensors, with the one or more transfer functions in turn being used to calculate one or more correction signals in act 3110.

Figure 24:
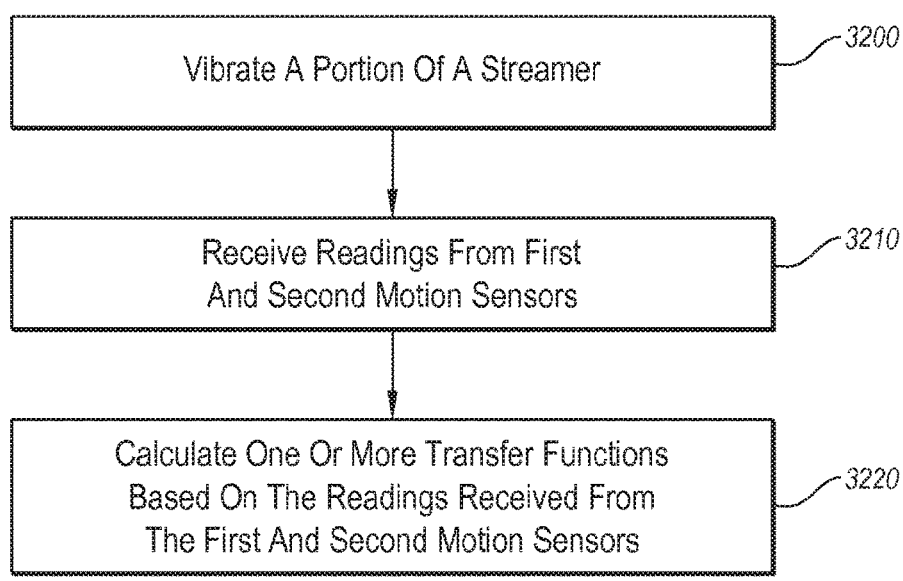
FIG. 24 is a chart of acts for calibrating a streamer according to an embodiment.

In some embodiments, the signal processor and/or the controller may cause the artificial vibration sources vibrate the stress member in a manner that facilitates calibration of the streamer, which may include obtaining one or more transfer functions. For instance, as shown in FIG. 24, the signal processor and/or the controller may perform an act 3200 of vibrating a portion of the streamer. In one example, the signal processor and/or the controller may activate one or more vibration sources, which may vibrate a portion of the streamer, such as the stress member.

The signal processor and/or the controller may also perform an act 3210 of receiving readings from first and second (and possibly third) motion sensors. In one embodiment, the signal processor and/or the controller may receive readings from the motion sensor 1930 and motion sensor 1940 or from the motion sensor 1950 and motion sensor 1940, or from motion sensors 1930, 1940, 1950 (FIG. 24). Moreover, the processing device may perform and act 3220 of calculating one or more transfer functions based on the readings received from the first and second motion sensors (e.g., as described above).

Figure 25:
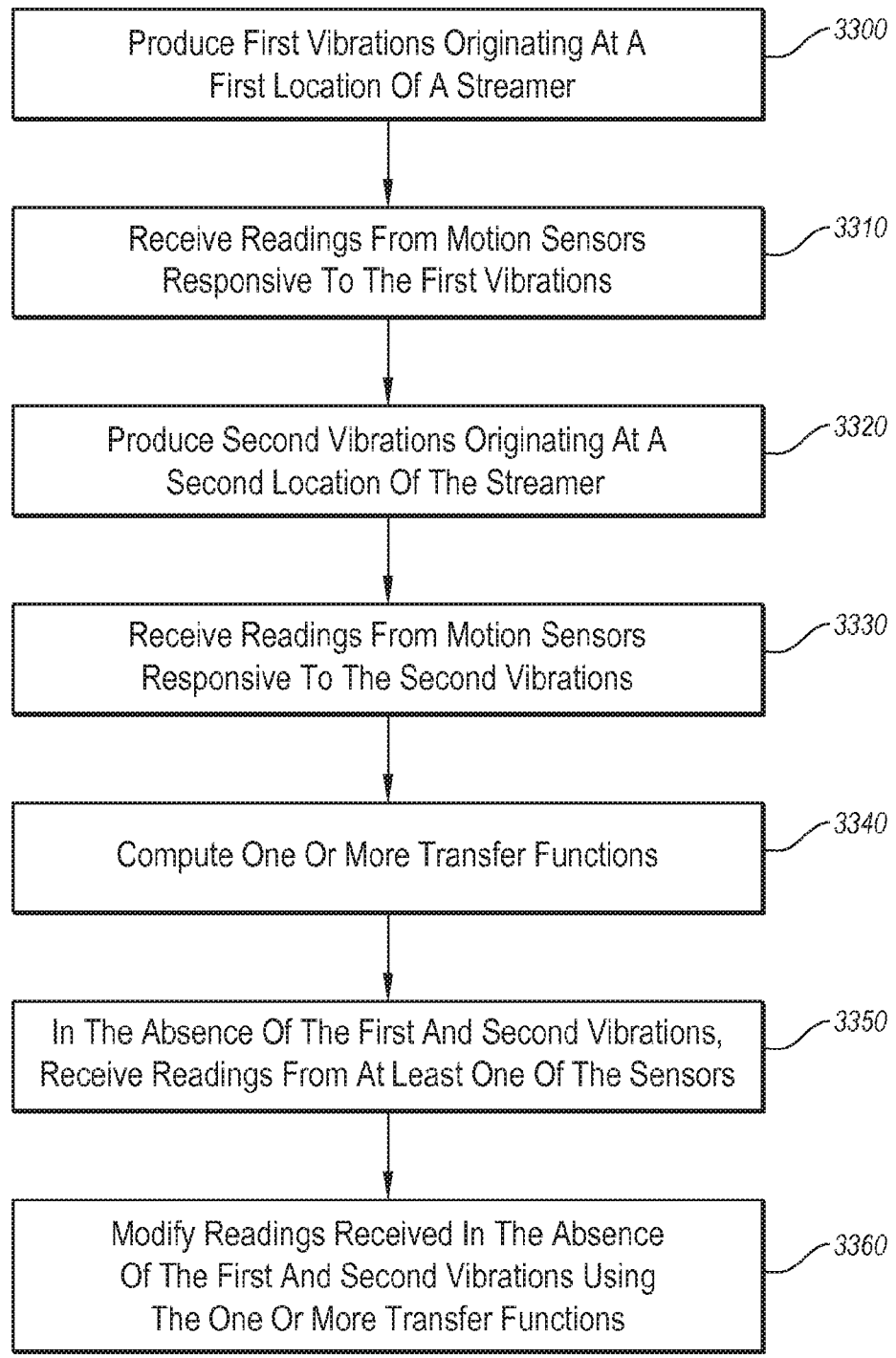
FIG. 25 is a chart of acts for operating a streamer according to an embodiment.

Accordingly, in some embodiments, as shown in FIG. 25, the processing device may perform any number of acts that may produce transfer functions and correction signals for the streamer as well as obtain or receive unfiltered readings from the streamer and filter such readings. More specifically, in at least one example, the processing device may perform an act 3300 of producing first vibrations originating at a first location of a portion of a streamer. For instance, the first vibrations may be produced or originated at the first location on the stress member. In an embodiment, the first location may be near one or more motions sensors (e.g., near the motion sensor 1930 (FIG. 19A)). As described above, the first location may be such that vibrations may propagate along the stress member and toward two or more motion sensors (e.g., toward motion sensors 1930, 1950, and 1940 (FIG. 19A)).

The processing device may also perform an act 3310 of receiving readings from motion sensors responsive to the first vibrations. For example, vibrations propagating along the stress member and toward two or more sensors may be sensed by such sensors and the readings from such sensors may be received by the signal processor and/or by the controller.

As described above, in some embodiments, two correction signals may be used to filter noise. Hence, in at least one example, the signal processor and/or the controller may perform an act 3320 of producing second vibrations originating at a second location of the portion of the streamer and an act 3330 of receiving readings from motion sensors responsive to the second vibrations. In one or more embodiments, the second location may be different from the first location. For example, the second location may be such that the second vibrations propagate toward motion sensor 1950 and subsequently toward motion sensor 1940 and motion sensor 1930 (FIG. 19A).

The processing device may also perform an act 3340 of computing one or more transfer functions. In an embodiment, the processing device may compute the one or more transfer functions in a manner described above.

Moreover, the processing device may perform one or more additional acts that may result in obtaining readings or values for acoustic waves. In some instances, such acts may be performed after determining the one or more transfer functions. For example, the processing device may perform an act 3350 of receiving readings from at least one sensor in the absence of the first and second vibrations. In other words, in some embodiments, the first and second vibrations may be absent (e.g., the processing device may turn off the first and second vibration sources), and the readings from the sensors may be received (e.g., from motion sensors 1930, 1940, 1950, or any combination thereof (FIG. 19A)). Such readings may be unfiltered and may represent acoustic vibrations sensed in the medium as well as non-acoustic vibrations or noise.

In some embodiments, the processing device may at least partially remove non-acoustic vibrations or noise or otherwise improve the unfiltered readings. For instance, the processing device may filter readings by performing an act 3360 of modifying the readings received in the absence of the first and second vibrations by using the transfer functions to obtain correction signals (e.g., transfer functions obtained in the act 3340). Hence, the processing device may reduce or eliminate noise or readings of non-acoustic vibrations from the unfiltered readings, which may improve the quality or accuracy of the unfiltered readings, such that the filtered readings are more representative of the actual acoustic vibrations in the medium.

It should be appreciated that acts described herein may be performed in any suitable order. Furthermore, as described below in further detail, any two or more acts described herein may be performed iteratively and/or repetitively or in a loop.

Figure 26:
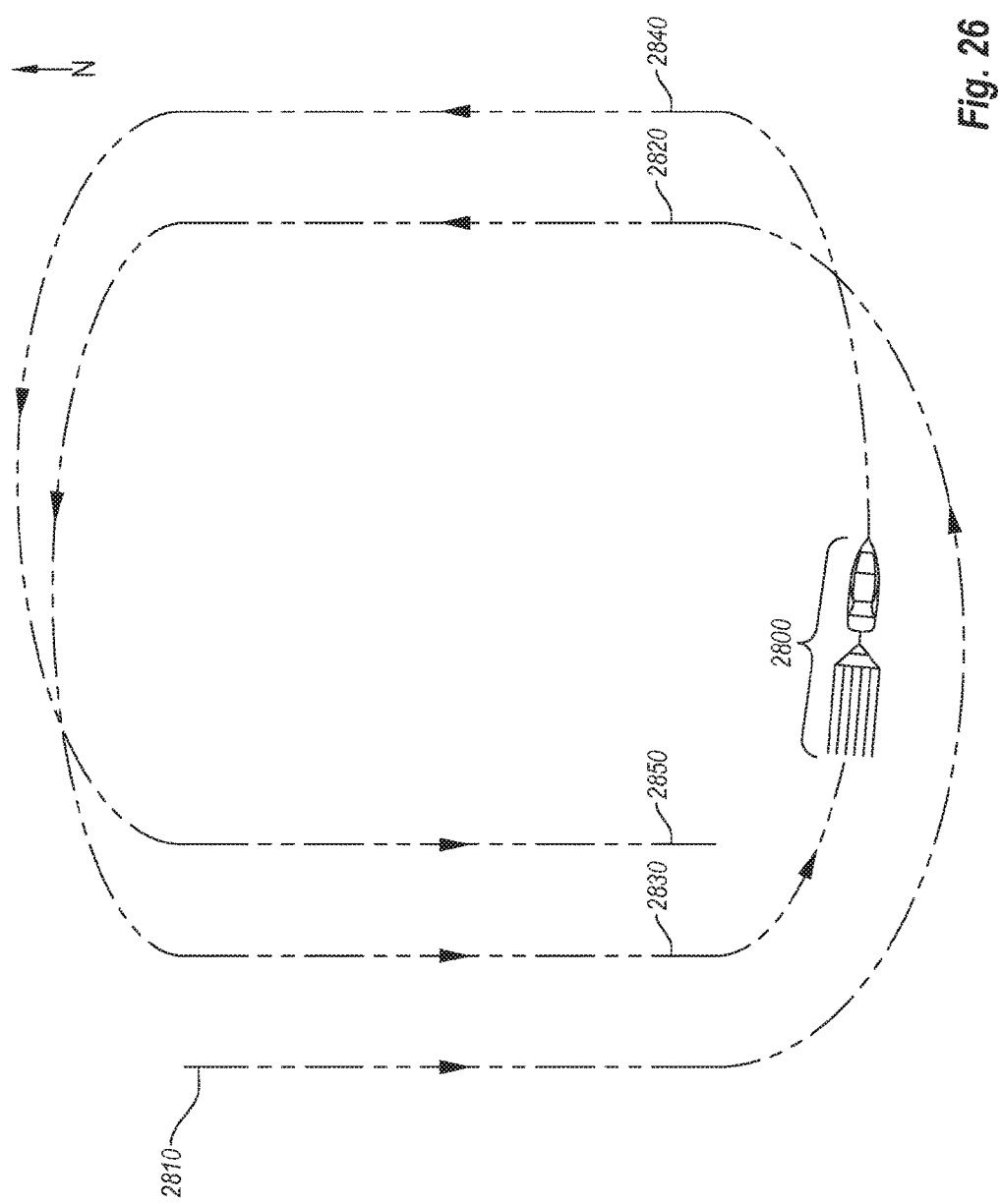
FIG. 26 is a schematic illustration of an exploration vessel's movement according to an embodiment.

The streamer may be used in various commercial applications, including but not limited to oil and gas exploration. In one embodiment, a single streamer or multiple streamers may be attached to a marine vehicle to form an exploration vessel, such as an exploration vessel 2800 illustrated in FIG. 26. Moreover, the exploration vessel 2800 may include one or more signal processors and/or controllers that may process signals or readings from the streamers, as described above. Additionally or alternatively, signal processor(s) and/or controller(s) may be physically located off the marine vehicle. In any event, in some embodiments, the exploration vessel 2800 may survey an area of a body of water by making one or more sail lines or passes as shown in FIG. 26. While a particular coverage pattern may vary from one embodiment to the next, in one example, the exploration vessel 2800 may complete one or more sail lines, such as by completing a first sail line 2810 and subsequently completing a second sail line 2820, a third sail line 2830, a fourth sail line 2840, a fifth sail line 2850, and so on.

Hence, the exploration vessel 2800 may map the bottom of the body of water (e.g., ocean), which may include mapping or identifying structures located on the bottom of the body of water or subsea strata. More specifically, the exploration vessel 2800 may sense acoustic vibrations that may be reflected from the bottom of the body of water. For example, as described above, the acoustic energy may be sent or directed downward through the water column and toward the ocean bottom, and may reflect off underlying structures or subsea strata. As such, in some embodiments, the exploration vessel 2800 may produce acoustic wave readings related to the structures underlying the body of water (i.e., one or more streamers of the exploration vessel may provide reading or signals to one or more signal processors and/or controllers), thereby identifying and/or mapping such structures (e.g., relative to geographic coordinates).

In some embodiments, the exploration vessel 2800 may recalibrate (i.e., re-characterize) one or more of the streamers or obtain new or updated transfer functions whenever the exploration vessel 2800 changes direction of movement, encounters water of different temperature or density, encounters a current, etc. For example, the exploration vessel 2800 may recalibrate the streamer(s) or obtain new transfer functions at the beginning of a sail line (e.g., at the beginning of each sail line).

Figure 27:
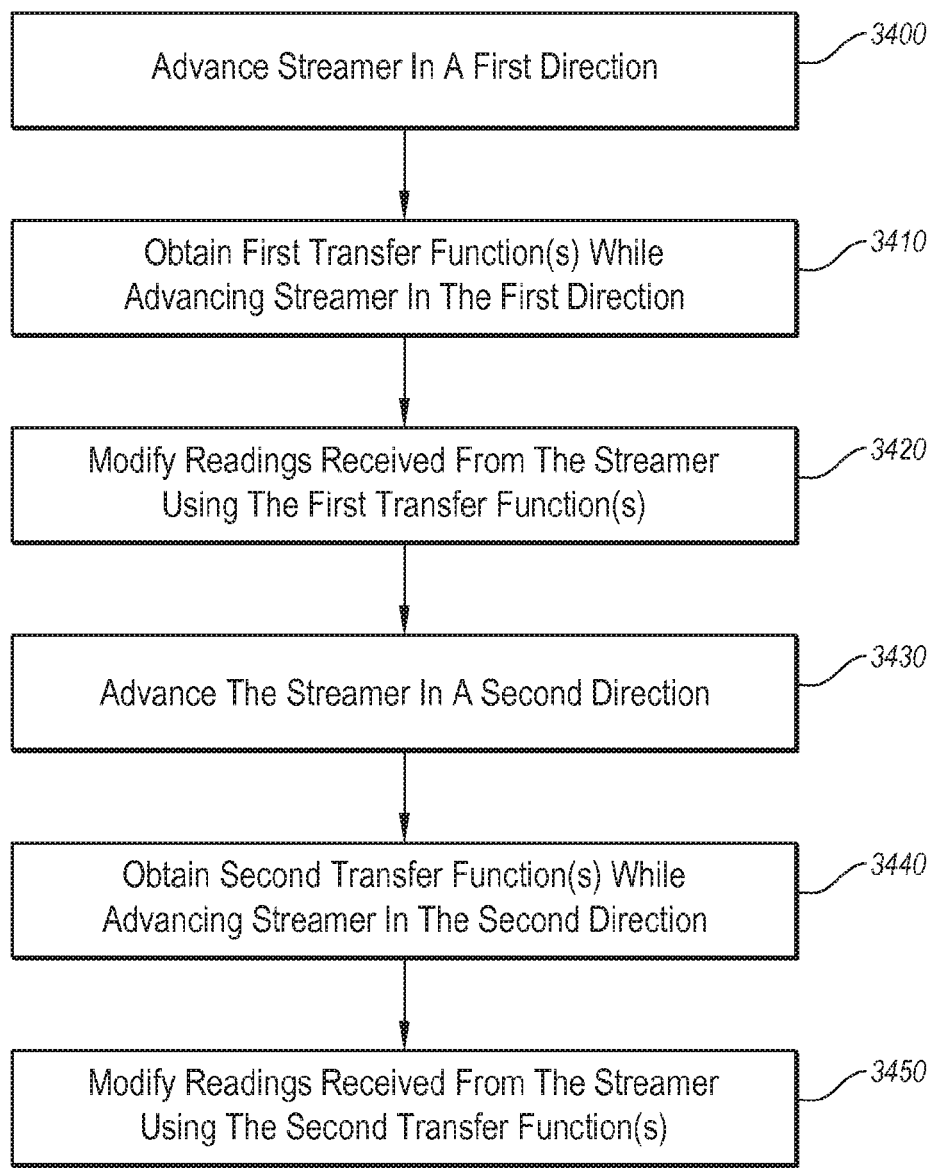
FIG. 27 is a chart of acts for calibrating the streamer according to an embodiment.

Hence, as illustrated in FIG. 27, at least one embodiment may include an act 3400 of advancing the streamer in the first direction within the medium. During such advancement, the processing device may perform an act 3410 of obtaining first transfer function(s). In additional or alternative embodiments, during advancement of the streaming in the first direction, the processing device may also perform and act 3420 of modifying readings received from the streamer using the first transfer function(s). In at least some instances, the act 3410 may be performed before the act 3420.

Moreover, an embodiment may include an act 3430 of advancing the streamer in a second direction. Similarly, while the streamer is advanced in the second direction, the processing device may perform an act 3440 of obtaining one or more second transfer function(s). The processing device may also perform an act 3450 of modifying readings received from the streamer using the second transfer function(s). Any of the acts described above may be performed in any sequence and/or repeatedly in a loop. For example, as described above, the transfer functions may be recalculated each time the streamer changes direction of advancement or movement.

Sample Solution

The following is a sample solution to the system of equations provided above.

$$U_{1a} = U_{1v1}G_1H_v + U_{1v2}(1-G_1)H_v$$

$$U_{2a} = U_{2v1}G_1H_v + U_{2v2}(1-G_1)H_v$$

$$A\ B\ C$$

$$\frac{U_{1a}}{U_{2a}} = \frac{[U_{1v1}G_1 + U_{1v2}(1-G_1)]H_v}{[U_{2v1}G_1 + U_{2v2}(1-G_1)]H_v}$$

$$D\ E\ F$$

$$\frac{A}{D} = \frac{C + G_1(B-C)}{F + G_1(E-F)}$$

$$AF + G_1 A(E-F) = DC + G_1 D(B-C)$$

$$G_1[A(E-F) - D(B-C)] = DC - AF$$

$$G_1[AE - AF - DB + DC] = DC - AF$$

$$G_1 = \frac{DC - AF}{AE - DB + (DC - AF)} = \frac{1}{\frac{AE - DB}{DC - AF} + 1}$$

$$G_1 = \frac{1}{\frac{U_{1a}U_{2v1} - U_{2a}U_{1v1}}{U_{2a}U_{1v2} - U_{1a}U_{2v2}} + 1} \quad G_2 = 1 - G_1$$

$$H_{1v} = \frac{U_{1a}}{U_{1v1}G_1 + U_{1v2}(1-G_1)}$$

$$H_{2v} = \frac{U_{2a}}{U_{2v1}G_1 + U_{2v2}(1-G_1)}$$

$$H_v = \frac{(H_{1v} + H_{2v})}{2}$$

In the foregoing, reference is made to embodiments of the invention. However, it should be understood that the invention is not limited to specific described embodiments. Instead, any combination of the features and elements, whether related to different embodiments or not, is contemplated to implement and practice the invention. Thus while the apparatuses and associated methods in accordance with the present disclosure have been described with reference to particular embodiments thereof in order to illustrate the principles of operation, the above description is by way of illustration and not by way of limitation. Various modifications and alterations to the described embodiments will be apparent to those skilled in the art in view of the teachings herein. Those skilled in the art may, for example, be able to devise numerous systems, arrangements and methods which, although not explicitly shown or described herein, embody the principles described and are thus within the spirit and scope of this disclosure. Accordingly, it is intended that all such alterations, variations, and modifications of the disclosed embodiments are within the scope of this disclosure.

In methodologies directly or indirectly set forth herein, various steps and operations are described in one possible order of operation, but those skilled in the art will recognize that the steps and operations may be rearranged, replaced, or eliminated without necessarily departing from the spirit and scope of the disclosed embodiments. Further, all relative and directional references used herein are given by way of example to aid the reader's understanding of the particular embodiments described herein. They should not be read to be requirements or limitations, particularly as to the position, orientation, or use of the disclosed embodiments.

Furthermore, in various embodiments, the disclosure provides numerous advantages over the prior art. However, although embodiments may achieve advantages over other possible solutions and/or over the prior art, whether or not a particular advantage is achieved by a given embodiment is not limiting of the disclosure. Thus, the described aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

What is claimed is:

1. A method of sensing acoustic waves in a medium, the method comprising:
   receiving readings from a first motion sensor and a second motion sensor coupled to a streamer, wherein the streamer comprises an elongated cable member disposed in the medium and the acoustic waves reflect from structures underlying the medium;
   receiving readings comprising unfiltered acoustic wave signals from a third motion sensor coupled to the streamer between the first motion sensor and the second motion sensor; and
   filtering noise from the readings received from the third motion sensor to generate a set of filtered data, wherein said filtering noise includes determining first and second transfer functions corresponding to the streamer; and
   modifying the readings received from the first motion sensor using the first transfer function to generate a first set of modified readings;
   modifying the readings received from the second motion sensor using the second transfer function to generate a second set of modified readings; and
   modifying the readings received from the third motion sensor using the first and second sets of modified readings to generate the set of filtered data;
   wherein the unfiltered acoustic wave signals are processed to reduce non-acoustic noise and modified to produce the filtered acoustic wave signal, which represents the acoustic waves propagating through the medium; and
   producing readings of the acoustic waves related to the underlying structures, and identifying or mapping the structures thereby.

2. The method of claim 1, wherein said first and second transfer functions are determined prior to receiving the readings from the first, second, and third motion sensors.

3. The method of claim 2, wherein said determining the first and second transfer functions comprises:
   introducing first vibrations into the streamer using a first vibration source;
   sensing the first vibrations using at least the first and third motion sensors;
   introducing second vibrations into the streamer using a second vibration source;
   sensing the second vibrations using at least the second and third motion sensors; and
   calculating the first and second transfer functions based on said sensing of the first and second vibrations.

4. The method of claim 1, wherein modifying the readings received from the first motion sensor using the first transfer function includes multiplying the readings received from the first motion sensor by the first transfer function, and modifying the readings received from the second motion sensor using the second transfer function includes multiplying the readings received from the second motion sensor by the second transfer function.

5. The method of claim 4, wherein modifying the readings received from the third motion sensor comprises subtracting said first and second sets of modified readings from the readings from the third motion sensor.

6. The method of claim 1, further comprising:
advancing the streamer through the medium in a first direction, and determining the first and second transfer functions corresponding to the streamer advancing in the first direction; and
advancing the streamer through the medium in a second direction, and determining third and fourth transfer functions corresponding to the streamer advancing in the second direction.

7. A method of characterizing a marine seismic streamer according to claim 1, the method further comprising:
delivering first vibrations to a first portion of the streamer, the first vibrations propagating toward the first motion sensor and further toward the second motion sensor;
receiving first readings from the first motion sensor and from the second motion sensor corresponding to said first vibrations;
delivering second vibrations to a second portion of the streamer, the second vibrations propagating toward the third motion sensor and further toward the second motion sensor;
receiving second readings from the second motion sensor and from the third motion sensor corresponding to said second vibrations; and
calculating one or more of the first and second transfer functions representative of the marine seismic streamer based on the received first and second readings.

8. The method of claim 7, wherein said one or more transfer functions are representative of physical characteristics of the streamer that determine how noise is transmitted along the streamer.

9. A method of sensing acoustic waves in a medium according to claim 1, the method further comprising:
transmitting first vibrations using a first vibration source positioned at a first location along the streamer;
sensing the first vibrations using the first motion sensor and the second motion sensor;
transmitting second vibrations using a second vibration source positioned at a second location along the streamer;
sensing the second vibrations using the third motion sensor and the second motion sensor;
characterizing the streamer based at least in part on said sensing of the first and second vibrations; and
filtering acoustic wave measurements from the second motion sensor based at least in part on said characterizing of the streamer.

10. The method of claim 9, wherein said first and second vibrations each include a sweep of a plurality of vibration frequencies.

11. A method of sensing acoustic waves propagating in a medium, the method comprising:
receiving readings comprising unfiltered acoustic signals from a first motion sensor and a second motion sensor coupled to a streamer disposed in the medium;
receiving readings comprising unfiltered acoustic signals from a third motion sensor coupled to the streamer between the first motion sensor and the second motion sensor, wherein the unfiltered acoustic wave signals include non-acoustic noise;
filtering noise from the readings received from the third motion sensor to generate a set of filtered data, wherein said filtering noise includes
determining first and second transfer functions corresponding to the streamer,
modifying the readings received from the first motion sensor using the first transfer function to generate a first set of modified readings,
modifying the readings received from the second motion sensor using the second transfer function to generate a second set of modified readings, and
modifying the readings received from the third motion sensor using the first and second sets of modified readings to generate the set of filtered data; and
calculating a filtered acoustic wave signal based at least in part on the transfer functions, wherein the unfiltered acoustic wave signals are processed to reduce the non-acoustic noise and modified to produce the filtered acoustic wave signal, the filtered acoustic wave signal representing the acoustic waves propagating through the medium;
producing readings of the acoustic waves related to the underlying structures and identifying or mapping the structures thereby.

12. The method of claim 11, further comprising vibrating an elongated member of the streamer with a vibration source operably coupled thereto and calculating the transfer functions at least partially based on information received from the first and second motion sensors spaced apart along the elongated member and sensitive to vibrations thereof, while the vibration source vibrates the elongated member.

13. The method of claim 12, further comprising calculating the transfer functions at least partially based on information received from the third motion sensor spaced apart from the first and second motion sensors along the elongated member and sensitive to the vibrations thereof, while the vibration source vibrates the elongated member.

14. The method of claim 12, wherein the elongated member comprises a rope, cable, stress member or skin.

15. The method of claim 11, further comprising vibrating an elongated member of the streamer with first and second vibration sources operably coupled thereto, wherein the first vibration source is connected to the elongated member at a first point and the second vibration source is connected to the elongated member at a second point.

16. The method of claim 15, wherein the first position motion sensor is positioned between the first point and the second motion sensor and vibration introduced at the first point propagates along the elongated member from the first point to the first motion sensor and subsequently to the second motion sensor and to the third motion sensor.

17. The method of claim 16, wherein vibration introduced at the second point propagates from the second point to the third motion sensor and subsequently to the second motion sensor and to the first motion sensor.

18. The method of claim 16, further comprising introducing the vibrations at the first and second points and calculating a first transfer function from the first motion sensor to the second motion sensor and the second transfer function from the third motion sensor to the second motion sensor.

19. The method of claim 16, further comprising advancing the streamer through the medium, wherein the streamer is towed by a marine vessel along a sail line.

20. The method of claim 19, further comprising advancing the streamer through the medium in a first direction and determining the first and second transfer functions corresponding to the streamer advancing in the first direction, and further advancing the streamer through the medium in a second direction and determining third and fourth transfer functions corresponding to the streamer advancing in the second direction.

\* \* \* \* \*